(12) United States Patent
Chee et al.

(10) Patent No.: US 10,192,583 B2
(45) Date of Patent: Jan. 29, 2019

(54) VIDEO EDITING USING CONTEXTUAL DATA AND CONTENT DISCOVERY USING CLUSTERS

(71) Applicant: Samsung Electronics Co., Ltd., Gyeonggi-Do (KR)

(72) Inventors: Meng Chee, Los Gatos, CA (US); Paul Dixon, Redwood City, CA (US); Florian Dusch, Stuttgart (DE); Hyung Keun Kim, Stuttgart (DE); Luyza Viana Pereira, Stuttgart (DE); Bartley H. Calder, San Jose, CA (US); Scott Barrow, Oakland, CA (US); Sudhir Kumar Misra, Richardson, TX (US); Gabriel Nicolae, Dallas, TX (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/811,465

(22) Filed: Jul. 28, 2015

(65) Prior Publication Data

US 2016/0104508 A1 Apr. 14, 2016

Related U.S. Application Data

(60) Provisional application No. 62/062,632, filed on Oct. 10, 2014, provisional application No. 62/062,769, filed on Oct. 10, 2014.

(51) Int. Cl.
*G11B 27/031* (2006.01)
*G11B 27/06* (2006.01)
(Continued)

(52) U.S. Cl.
CPC ............ *G11B 27/031* (2013.01); *G11B 27/06* (2013.01); *G11B 27/11* (2013.01); *G11B 27/34* (2013.01);
(Continued)

(58) Field of Classification Search
None
See application file for complete search history.

(56) References Cited

U.S. PATENT DOCUMENTS 8,161,052 B2 4/2012 Reddy et al.
8,650,149 B2 2/2014 Flinn et al.
(Continued)

FOREIGN PATENT DOCUMENTS

EP 2487683 A1 8/2012
KR 1020070041932 A 4/2007
(Continued)

OTHER PUBLICATIONS

WIPO Int'l. Appln. PCT/KR2015/010693, International Search Report, dated Jan. 15, 2016, 3 pg.
(Continued)

*Primary Examiner* — Justin E Shepard
(74) *Attorney, Agent, or Firm* — Cuenot, Forsythe & Kim, LLC

(57) ABSTRACT

Video editing using contextual data may include collecting metadata from a sensor concurrently with recording a video, wherein the metadata is synchronized in time with the video, detecting attributes within the metadata and attributes from the video, and correlating the attributes with a plurality of editors. An editor may be selected from the plurality of editors according to the correlating and a video editing workflow may be automatically initiated. Content discovery using clusters may include receiving a user request for video content from a device, determining a behavioral cluster for the user according to demographic data for the user, determining a video of interest associated with the behavioral cluster, and providing a video of interest to the device using the processor.

33 Claims, 15 Drawing Sheets

(51) Int. Cl.
*G11B 27/11* (2006.01)
*G11B 27/34* (2006.01)
*H04N 5/265* (2006.01)
*H04N 5/77* (2006.01)
*H04N 21/239* (2011.01)
*H04N 21/25* (2011.01)
*H04N 21/258* (2011.01)
*H04N 21/2668* (2011.01)
*H04N 5/783* (2006.01)
*H04N 9/82* (2006.01)
*H04N 21/2743* (2011.01)
*H04N 21/414* (2011.01)
*H04N 21/4788* (2011.01)
*H04N 21/854* (2011.01)
*H04N 21/422* (2011.01)
*H04N 21/472* (2011.01)
*H04N 21/4722* (2011.01)

(52) U.S. Cl.
CPC ............ *H04N 5/265* (2013.01); *H04N 5/77* (2013.01); *H04N 5/783* (2013.01); *H04N 9/8205* (2013.01); *H04N 21/2393* (2013.01); *H04N 21/252* (2013.01); *H04N 21/25883* (2013.01); *H04N 21/25891* (2013.01); *H04N 21/2668* (2013.01); *H04N 21/2743* (2013.01); *H04N 21/41407* (2013.01); *H04N 21/42201* (2013.01); *H04N 21/42202* (2013.01); *H04N 21/4722* (2013.01); *H04N 21/4788* (2013.01); *H04N 21/47205* (2013.01); *H04N 21/854* (2013.01)

(56) References Cited

U.S. PATENT DOCUMENTS

| | | | |
|---|---|---|---|
| 8,718,447 B2 | 5/2014 | Yang et al. | |
| 8,745,500 B1 | 6/2014 | Kostello et al. | |
| 8,751,472 B2 | 6/2014 | Mei et al. | |
| 2005/0217462 A1* | 10/2005 | Thomson | G10H 1/368 84/612 |
| 2006/0170388 A1* | 8/2006 | Nomura | G02B 27/646 318/685 |
| 2006/0184538 A1 | 8/2006 | Randall et al. | |
| 2006/0184980 A1 | 8/2006 | Cole | |
| 2007/0193438 A1* | 8/2007 | Asukai | A63B 24/0062 84/612 |
| 2007/0263978 A1 | 11/2007 | Yang et al. | |
| 2009/0163183 A1 | 6/2009 | O'Donoghue et al. | |
| 2010/0094866 A1 | 4/2010 | Cuttner et al. | |
| 2011/0026898 A1 | 2/2011 | Lussier et al. | |
| 2011/0161348 A1* | 6/2011 | Oron | G06F 17/30781 707/769 |
| 2011/0206351 A1 | 8/2011 | Givoly | |
| 2012/0017153 A1* | 1/2012 | Matsuda | G11B 27/034 715/725 |
| 2012/0166380 A1 | 6/2012 | Sridharan et al. | |
| 2012/0212398 A1* | 8/2012 | Border | G02B 27/017 345/8 |
| 2012/0271825 A1 | 10/2012 | Garthwaite et al. | |
| 2012/0290599 A1 | 11/2012 | Tian et al. | |
| 2012/0308209 A1 | 12/2012 | Zaletel | |
| 2012/0311448 A1 | 12/2012 | Achour et al. | |
| 2012/0315020 A1 | 12/2012 | Fiumi | |
| 2012/0324491 A1 | 12/2012 | Bathiche et al. | |
| 2013/0036117 A1 | 2/2013 | Fisher et al. | |
| 2013/0080455 A1 | 3/2013 | Martin et al. | |
| 2013/0110992 A1* | 5/2013 | Ravindra | H04W 8/18 709/220 |
| 2013/0132843 A1* | 5/2013 | Marnett | G06F 3/048 715/723 |
| 2013/0227415 A1 | 8/2013 | Gregg et al. | |
| 2013/0257770 A1 | 10/2013 | Tsaregorodtsev | |
| 2013/0259446 A1 | 10/2013 | Sathish | |
| 2013/0259447 A1 | 10/2013 | Sathish et al. | |
| 2013/0262210 A1* | 10/2013 | Savage | G06Q 30/02 705/14.26 |
| 2013/0330054 A1 | 12/2013 | Lokshin | |
| 2013/0343729 A1 | 12/2013 | Rav-Acha et al. | |
| 2014/0019443 A1 | 1/2014 | Golshan | |
| 2014/0032572 A1 | 1/2014 | Eustice et al. | |
| 2014/0072284 A1 | 3/2014 | Avrahami et al. | |
| 2014/0074866 A1 | 3/2014 | Shah et al. | |
| 2014/0078343 A1* | 3/2014 | Dai | H04N 5/772 348/231.99 |
| 2014/0133837 A1 | 5/2014 | Mate et al. | |
| 2014/0172856 A1* | 6/2014 | Imbruce | G06F 17/212 707/737 |
| 2015/0095882 A1* | 4/2015 | Jaeger | G06F 8/34 717/109 |
| 2015/0293675 A1* | 10/2015 | Bloch | G06F 3/04847 715/723 |
| 2015/0318020 A1* | 11/2015 | Pribula | H04N 21/43615 386/227 |

FOREIGN PATENT DOCUMENTS

WO 2007082166 A2 7/2007
WO 2013142966 A1 10/2013

OTHER PUBLICATIONS

WIPO Int'l. Appln. PCT/KR2015/010693, Written Opinion, dated Jan. 15, 2016, 5 pg.
EP Appln. No. 15849214.0, Supplementary European Search Report, dated Sep. 12, 2017, 14 pg.

* cited by examiner

VIDEO EDITING USING CONTEXTUAL DATA AND CONTENT DISCOVERY USING CLUSTERS

CROSS-REFERENCE TO RELATED APPLICATIONS

This application claims the benefit of U.S. Provisional Patent Application No. 62/062,632 filed on Oct. 10, 2014, and U.S. Provisional Patent Application No. 62/062,769 filed on Oct. 10, 2014, both of which are fully incorporated herein by reference.

TECHNICAL FIELD

This disclosure relates to video editing using contextual data and content discovery using clusters.

BACKGROUND

Usage of mobile communication devices equipped with video recording capabilities has become widespread. More users than ever are using these devices to record video on a regular basis. Despite the ease with which video may be recorded, other tasks such as video editing and video sharing remain less accessible to many users.

With regard to video editing, for example, users often need specialized knowledge of video equipment and/or sophisticated software tools. Editing video typically has involved transferring the recorded video from one's mobile communication device to a more powerful computer-based video editing system. Even with advanced knowledge and tools, however, video editing has remained a time-intensive task. Available video editing tools are largely unsuited for use by the growing number of mobile communication device users recording video.

Once a video is edited to a user's satisfaction, the user may wish to share the video with one or more other users through a social networking system. Sharing videos is often time consuming since the videos are typically uploaded to social networking systems. Another aspect of sharing is the ability of other users to find videos of interest. Locating videos of interest is often difficult given the vast amount of video content that is created and uploaded on a daily basis.

SUMMARY

A method may include collecting, using a processor, metadata from a sensor concurrently with recording a video, wherein the metadata is synchronized in time with the video, and detecting, using the processor, at least one of attributes of the metadata or attributes of the video. The method may include correlating, using the processor, the attributes with a plurality of editors, selecting, using the processor, an editor from the plurality of editors according to the correlating, and displaying, using the processor, the selected editor for the video.

A system may include a processor programmed to initiate executable operations. The operations may include collecting metadata from a sensor concurrently with recording a video, wherein the metadata is synchronized in time with the video, detecting at least one of attributes of the metadata or attributes of the video, and correlating the attributes with a plurality of editors. The executable operations also may include selecting an editor from the plurality of editors according to the correlating and displaying the selected editor for the video.

A computer program product may include a computer readable storage medium having program code stored thereon. The program code may be executable by a processor to perform a method. The method may include collecting metadata from a sensor concurrently with recording a video, wherein the metadata is synchronized in time with the video, detecting at least one of attributes of the metadata or attributes of the video, and correlating the attributes with a plurality of editors. The method may also include selecting an editor from the plurality of editors according to the correlating and displaying the selected editor for the video.

A method may include receiving a request for video content from a device using a processor, determining, using the processor, a behavioral cluster according to demographic data associated with the device, determining a video of interest associated with the behavioral cluster, and providing the video of interest to the device using the processor.

A system may include a processor programmed to initiate executable operations. The executable operations may include receiving a request for video content from a device, determining a behavioral cluster according to demographic data associated with the device, determining a video of interest associated with the behavioral cluster, and providing the video of interest to the device.

A computer program product may include a computer readable storage medium having program code stored thereon. The program code may be executable by a processor to perform a method. The method may include receiving a request for video content from a device, determining a behavioral cluster according to demographic data associated with the device, determining a video of interest associated with the behavioral cluster, and providing the video of interest to the device.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

Figure 1:
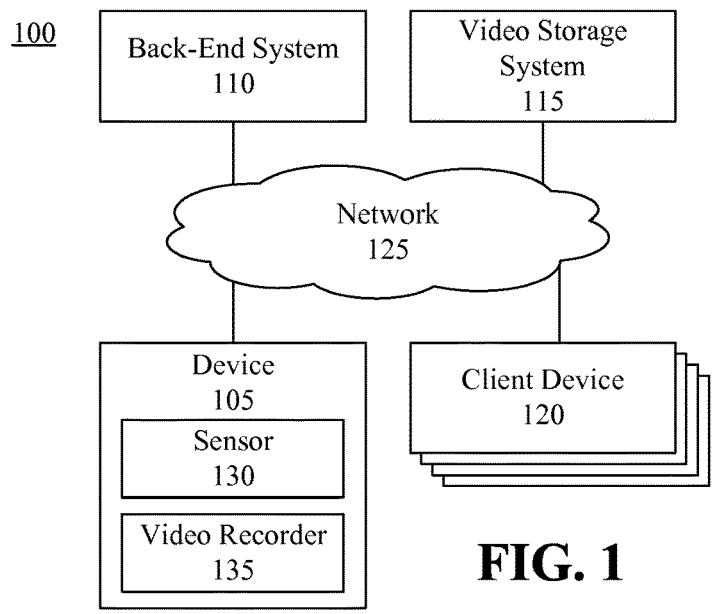
FIG. 1 is a block diagram illustrating an exemplary network computing system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to video editing using contextual data and content discovery using clusters. In accordance with one aspect of the inventive arrangements described herein, a recording device may be configured to record metadata from one or more sensors concurrently with recording video. The metadata may be synchronized in time with the video. The recording device may evaluate attributes of the recorded video and/or the metadata to select one or more editors. The selected editors may be presented to the user and/or arranged as part of a video editing workflow to be performed by the recording device. A user of the recording device may be guided through the video editing workflow to use the suggested editors thereby generating an edited video. The suggested video editing workflow reduces complexity of the video editing process by suggesting and utilizing the editors, e.g., only the editors in one aspect, for which the recording device determines a need or are suitable.

The editors may utilize attributes of the recorded video and/or the metadata to perform various video editing operations or suggest various video editing operations automatically. The recording device may include a touch-based user interface for providing direct manipulation of visual representations of video. Through user manipulation of the touch-based interface, a user may perform functions such as trimming regions from recorded video, adjust frame rates of the video over time for playback, overlay captions derived from the metadata on the video, splice videos together, synchronize video edits to an audio track, or the like.

In accordance with another aspect of the inventive arrangements described herein, a clustering technique may be used to aid users in locating videos of interest. The clustering technique may be implemented within one or more data processing systems, e.g., servers, operating as part of a back-end system. The back-end system may identify a user requesting video content. The user may be correlated with one or more behavioral clusters according to demographic data that is known for the user. The various behavioral clusters within the back-end system each may be associated with one or more videos. The back-end system may provide one or more of the videos associated with the behavioral cluster(s) associated with the user as video selection options to the device of the requesting user.

The inventive arrangements described herein may be implemented as a method or process performed by a data processing system. In another aspect, the inventive arrangements may be implemented as an apparatus such as a data processing system having a processor. The processor, upon executing program code, may perform one or more operations described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary network computing system 100. Network computing system 100 may include a device 105, a back-end system 110, a video storage system 115, and one or more client devices 120. Device 105, back-end system 110, video storage system 115, and client device 120 may be coupled, e.g., communicatively linked, through network 125.

Network 125 is the medium used to provide communication links between various devices and data processing systems connected together within network computing system 100. Network 125 may include connections, such as wire, wireless communication links, or fiber optic cables. Network 125 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Device 105 may be implemented as any of a variety of electronic devices. Exemplary implementations of device 105 may include, but are not limited to, communication devices, mobile phones, tablet computers, dedicated video recording devices, portable computers, and the like. Device 105 may include, or be coupled to, one or more sensors 130 and a video recorder 135.

Sensor 130 is configured to record data items collectively referred to as metadata. Exemplary sensors 130 may include, but are not limited to, accelerometers, gyroscopes, digital compasses, global positioning system (GPS) receivers, light detectors, and the like. Sensor 130 may also include any of a variety of biological and/or medical sensors. Examples of biological and/or medical sensors may include, but are not limited to, heart rate monitors, body temperature monitors, blood pressure monitors, etc.

Metadata may also include data that is obtained from one or more different services. For example, online services may provide information such as current quotes for securities, currency, weather information, the ability to convert longitude and latitude coordinates to city or location names, and the like. This information may be collected from time-to-time, periodically, etc., concurrently with recording video and stored as part of the metadata.

Video recorder 135 is configured to record video. The recorded video may include both audio content and visual content. Video recorder 135 may record video at one or more different frame rates that may be higher or lower than conventional frame rates. Device 105 may record video concurrently with collecting and storing metadata. The recorded metadata may be stored in synchronization with the video. For example, each item of metadata may be time stamped so that the items of metadata may be associated and aligned with particular times during the recorded video. The recorded video and the recorded metadata may be stored within device 105. In another aspect, however, the recorded video and metadata may be stored in a different device.

Back-end system 110 may be implemented as one or more data processing system. In one aspect, back-end system 110 may be implemented as one or more networked computers, e.g., servers. Back-end system 110 may include one or more physical computers and/or one or more virtual servers. It should be appreciated, however, that a virtual server or other virtual data processing system still executes within a physical data processing system.

In one aspect, back-end system 110 may implement a classification technique that may be used to provide video selections or options to requesting devices. For example, back-end system 110 may receive a request for video content from device 105 and/or from one or more of client devices 120. Back-end system 110, in response to such a request, may select one or more video options using a process that leverages demographic data and existing behavioral clusters.

Video storage system 115 may be implemented as one or more data processing systems as described with reference to back-end system 110. Video storage system 115 may store one or more videos for retrieval, streaming, viewing, or the like. In one aspect, video storage system 115 may store videos offered by back-end system 110 as video selection options to be provided to users responsive to requests for video content.

Client devices 120 may be implemented as any of a variety of computing devices or combinations thereof. Exemplary implementations of client device 120 may include, but are not limited to, mobile phones, computers whether a desktop computer, a laptop, a tablet computer, etc. In one aspect, client devices 120 may include hardware and/or software necessary to implement video access features and/or video playback features described within this disclosure.

In operation, device 105 may record video and metadata concurrently. Device 105 may analyze the recorded video and/or metadata. Based upon the analysis, device 105 may suggest one or more particular editors for the user of device 105 to use in editing the video. The editors suggested by device 105 may be organized into a video editing workflow. Edited video, once complete, may be uploaded to video storage system 115.

Users of device 105 and/or client devices 120 may request video content from back-end system 110. Back-end system 110 may identify the particular user making the request and determine, or select, one or more behavioral clusters from a plurality of behavioral clusters with which the requesting user has an association. Back-end system 110 may determine one or more videos associated with the selected behavioral clusters. Back-end system 110 may provide the determined videos to the requesting device, e.g., device 105 and/or client devices 120, as options for viewing and/or sharing. For example, back-end system 110 may provide a link to one or more or each of the determined videos to the requesting device.

FIG. 1 is provided for purposes of illustration only. Within FIG. 1, client device 105 is shown as being distinct from client devices 120. It should be appreciated, however, that recording device 105 may also include hardware and/or software similar to, or the same as, that of client devices 120. As such, in some cases, in addition to the various features attributed to recording device 105 above, recording device 105 may also function and/or operate similar to, or the same as, as one of client devices 120. Similarly, one or more of client devices 120 may include one or more sensor(s) 130 and/or video recorder 135. Accordingly, in addition to the various features attributed to client devices 120, in some cases, one or more of client devices 120 may function and/or operate similar to, or the same as, recording device 105.

Figure 2:
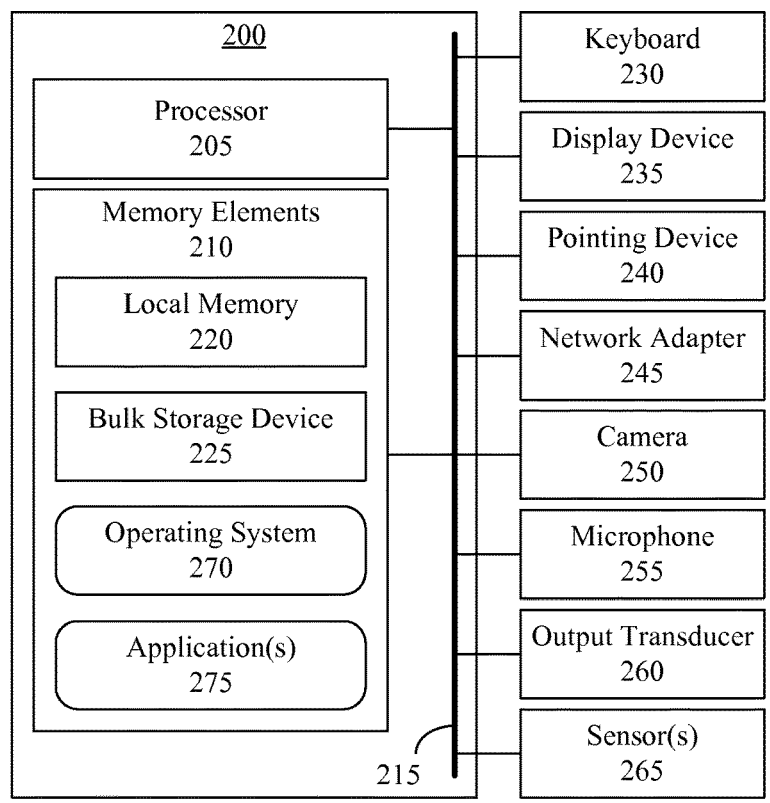
FIG. 2 is block diagram illustrating an exemplary architecture for a data processing system.

FIG. 2 is block diagram illustrating an exemplary architecture for a data processing system. Architecture 200 may be used to implement any of a variety of systems and/or devices that include a processor and memory and that are capable of performing the operations described within this disclosure. For example, architecture 200 may be used to implement any of a variety of different devices such as device 105, client device(s) 120, and/or back-end system 110. In some cases, the particular device implemented using architecture 200 may include fewer components than shown or more components than shown. Further, the particular operating system and/or application(s) included may vary.

As pictured, architecture 200 includes at least one processor, e.g., a central processing unit (CPU), 205 coupled to memory elements 210 through a system bus 215 or other suitable circuitry. Architecture 200 stores program code within memory elements 210. Processor 205 executes the program code accessed from memory elements 210 via system bus 215. Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), a solid state drive (SSD), or another persistent data storage device. Architecture 200 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to architecture 200. In some cases, one or more of the I/O devices may be combined as in the case where a touchscreen is used as display device 235. In that case, display device 235 may also implement keyboard 230 and pointing device 240. One or more network adapters 245 may also be coupled to architecture 200 to enable architecture 200 to become coupled to other systems, computer systems, remote printers, and/or remote storage devices through intervening private or public networks. Modems, cable modems, Ethernet cards, and wireless transceivers (e.g., wireless radios) are examples of different types of network adapter 245 that may be used with architecture 200. Depending upon the particular device implemented with architecture 200, the specific type of network adapter, or network adapters as the case may be, will vary.

The I/O devices may also include a camera 250, a microphone 255, and an output transducer 260. Output transducer 260 may be a speaker. In one aspect, camera 250 and microphone 255 may be considered part of a video recording system such as video recorder 135 within device 105 of FIG. 1. The video recording system, as implemented using architecture 200, may include one or more applications controlling operation of camera 250 and/or microphone 255.

One or more sensors 265 may be coupled to architecture 200. Examples of sensors 265 may include, but are not limited to, accelerometers, gyroscopes, light sensors, biological and/or medical sensors, and the like. While microphone 255 may be considered a sensor in some cases, e.g., an audio sensor, for purposes of discussion, microphone 255 may be considered part of the video recording system to the extent that the audio is part of the recorded video. In this regard, content generated by microphone 255 may be considered part of recorded video, i.e., the audio portion of the recorded video, as opposed to metadata. In other cases, audio and/or events detected within and/or from audio obtained by microphone 255 may be considered part of the metadata.

The various I/O devices and/or sensors described herein may be coupled to architecture 200 either directly or through intervening I/O controllers. An amplifier or other driver circuit may be used to couple output transducer 260 to architecture 200.

As pictured in FIG. 2, memory elements 210 store an operating system 270 and one or more applications 275. In one aspect, operating system 270 and application(s) 275, being implemented in the form of executable program code, are executed by architecture 200. As such, operating system 270 and application(s) 275 may be considered an integrated part of architecture 200. Operating system 270, application(s) 275, and any data items used, generated, and/or operated upon by architecture 200, are functional data structures that impart functionality when employed as part of a system implemented using architecture 200.

In one exemplary implementation, architecture 200 may be used to implement device 105 of FIG. 1. In that case, one or more of applications 275, when executed, may implement the video processing operations described herein such as video recording, capturing and/or storing metadata, analyzing recorded video and/or metadata, performing video editing operations, and the like.

In another exemplary implementation, architecture 200 may be used to implement back-end system 110 of FIG. 1. In that case, one or more of applications 275, when executed, may implement the video suggestion and delivery operations described herein that utilize behavioral clusters. When used to implement back-end system 110, architecture 200 may not include one or more components as noted. For example, architecture 200 may be implemented as a server and may not include camera 250, microphone 255, output transducer 260, and/or sensors 265.

Figure 3:
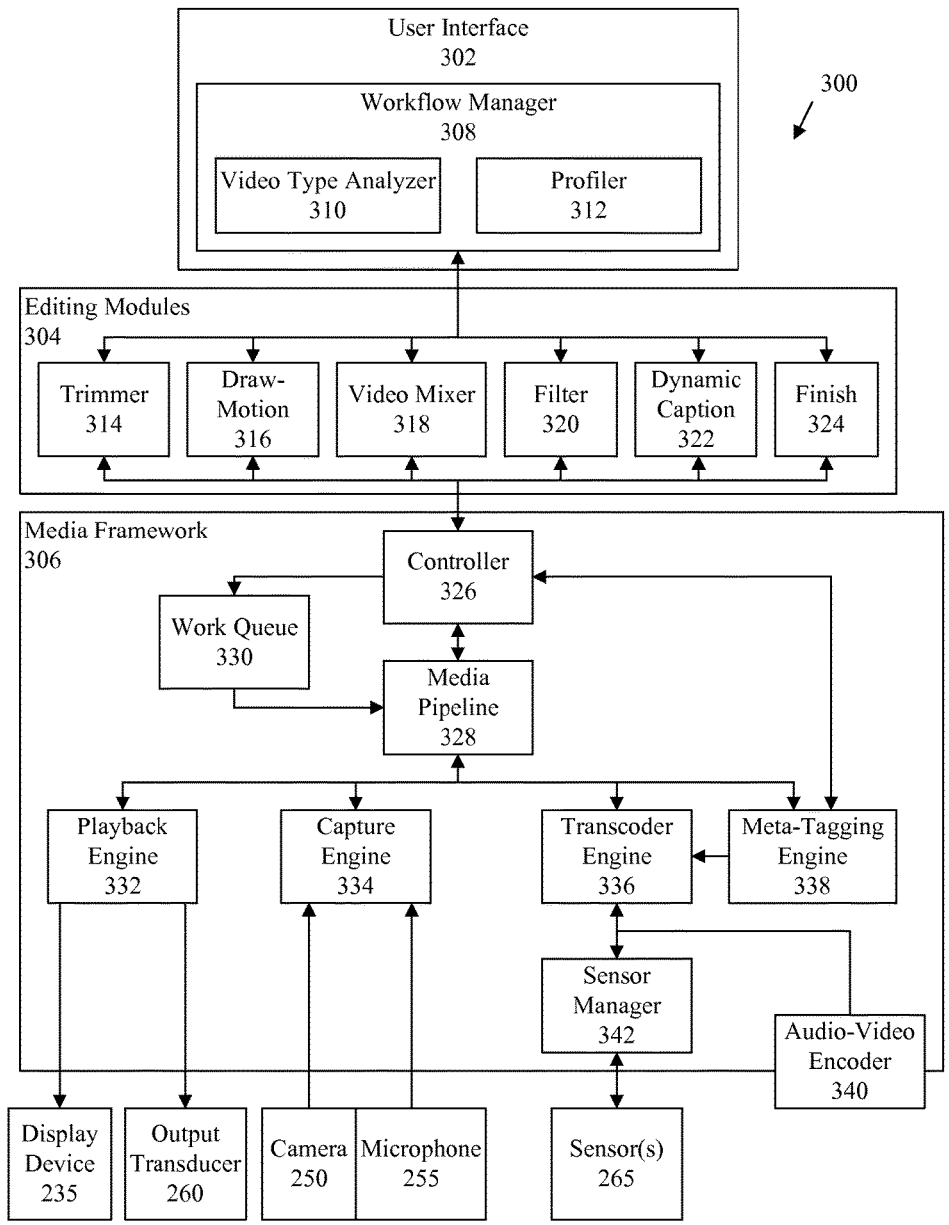
FIG. 3 is a block diagram illustrating an exemplary software architecture for a data processing system.

FIG. 3 is a block diagram illustrating an exemplary software architecture 300 for a data processing system. Software architecture 300 may be an exemplary implementation of application 275 of FIG. 2 in the case where architecture 200 is used to implement device 105 of FIG. 1. Software architecture 300 includes user interface 302, editors 304, and media framework 306.

In one aspect, user interface 302 may be implemented as a touch screen user interface. It should be appreciated that the inventive arrangements described herein are not intended to be limited to a touch screen interface as other interface types, e.g., a non-touch graphical user interface, may be used as well. User interface 302 may be configured to detect user inputs such as gestures, including touches and the like, and translate the detected gestures into commands that are understandable by editors 304 and/or media framework 306. User interface 302, for example, provides the user with a sense of direct physical manipulation of video content.

User interface 302 may include a workflow manager 308. Workflow manager 308 is configured to provide consistent and coherent control over the various operations that may be performed by one or more or all of editors 304. In one aspect, for example, workflow manager 308 is configured to track any edits to video being processed. Workflow manager 308 further may create work items compatible with an application programming interface of controller 326 within media framework 306. A work item is a video editing operation to be executed. In one aspect, two or more work items may be referred to as a video editing workflow. A video editing workflow may include one or more work items to be performed by one or more of editors 304 to create an edited video.

Editors 304 may include a trimmer 314, a draw motion creator 316, a video mixer 318, a filter 320, a dynamic caption creator 322, and a finisher 324. In one aspect, architecture 300 implements a plug-in architecture in which additional editors may be added or incorporated. For example, each of editors 304 may be a plug-in. The particular operations that may be performed by editors 314-324 will be described in greater detail herein. Since editors 304 may be implemented as executable program code, the various operations described herein attributable to one or more of editors 304 may be performed by a processor, or processors, executing the program code of one or more of the respective editors 304.

Workflow manager 308 interacts with editors 304. In illustration, if trimmer 314 is used denote a portion of a recorded video that is to be cut, or removed, workflow manager 308 may track the edit, e.g., the work items, in order to maintain consistency with the use of other editors. Workflow manager 308, for example, may create a work item to access controller 326 to initiate the required operation, i.e., removal of indicated portion(s) from a video being edited.

Workflow manager 308 further may include a video analyzer 310 and a profiler 312. Video analyzer 310 may be configured to analyze recorded video and determine various attributes including, but not limited to, trimming indicators, video type, motion, frame rate, starting and/or ending times of videos, or the like. Video analyzer 310, for example, may detect any of the various attributes of video described within this specification. Profiler 312 may be configured to analyze metadata and detect one or more attributes within the metadata. For example, profiler 312 may be configured to detect trimming indicators, motion, starting time and ending time of video, or the like within metadata. Profiler 312, for example, may detect any of the various attributes of metadata described within this specification.

Referring to media framework 306, controller 326 may operate as an interface for the remaining blocks of media framework 306. Controller 326, for example, may provide user interface 302 with access, through the noted application programming interface, to various operations and/or services provided by media framework 306. Controller 326 further may be configured to determine whether a given workflow, in reference to one or more work items, has been finalized. Controller 326 further determines whether resources are available to execute the work items using media pipeline 328. In the case where resources are not available to execute a work item, controller 326 may store the work item in work queue 330 until the workflow has been finalized and resources are available to implement the work items of the workflow.

Work queue 330 is a staging queue, e.g., temporary storage area, for work items created by user interface 302. Work queue 330, for example, may store each of the work items requested by user interface 302. Once user interface 302 finalizes the workflow, e.g., responsive to a user command to finalize, the work items stored in work queue 330 may be sanitized and/or submitted to media pipeline 328.

Media pipeline 328 is a subsystem that may be configured to operate as a high level manager of video creation and/or video playback. Regarding video creation, media pipeline 328 may read work items from work queue 330 or directly from controller 326. Media pipeline 328 may create and execute the work items by utilizing playback engine 332, capture engine 334, transcoding ending 336, and/or meta-tagging engine 338. As pictured controller 326 may be directly coupled to meta-tagging engine 338.

Playback engine 332 may be configured to play video whether edited or not. Playback engine 332, for example, may play video back through display device 235 and output transducer 260. Capture engine 334 may be configured to capture, or record, video, including visual data and audio data. Capture engine 334, for example, may capture video using camera 250 and microphone 255.

Audio/video encoder 340 may be configured to encode captured video, i.e., graphic data and audio data, into any of a variety of different formats of media files. In one aspect, audio-video encoder 340, which is pictured as being partially included in software architecture 300 and partially outside of software architecture 300 may be implemented using dedicated hardware, firmware, software, and/or any combination thereof.

Sensor manager 342 is configured to interface with and control the various sensors 265 that are available for capturing metadata. Sensor manager 342, for example, may receive items of metadata from sensors 265 over time as video is recorded by capture engine 334. Sensor manager 342 may include an engine that synthesizes one or more particular items of metadata to derive other forms of metadata. For example, the engine of sensor manager 342 may utilize GPS coordinates over time to calculate a speed in miles per hour or in kilometers per hour of a device, query a service for a location using coordinates, etc.

Transcoder engine 336 may be configured as a high level system responsible for performing video editing processing based on the work items received from media pipeline 328. The exemplary operations may include merging multiple videos or video segments together, trimming a video, captioning (e.g., overlaying captioning on video using metadata from the sensors), controlling the timing of the video such as play back rate, and/or applying selected filters to the video.

Meta-tagging engine 338 may be configured as a system that embeds a unique uniform resource locator (URL) in the various videos (e.g., video files) that are recorded and/or generated through editing in order to manage storage and retrieval of videos within the video recorder or within another physical system, e.g., remote storage such as so called cloud storage or video storage system 115. It should be appreciated that any metadata that is collected concurrently with a video may be stored with the video and/or in association with the video so that recall of the metadata recorded concurrently with the video may be retrieved from storage using the URL of the video.

Figure 4:
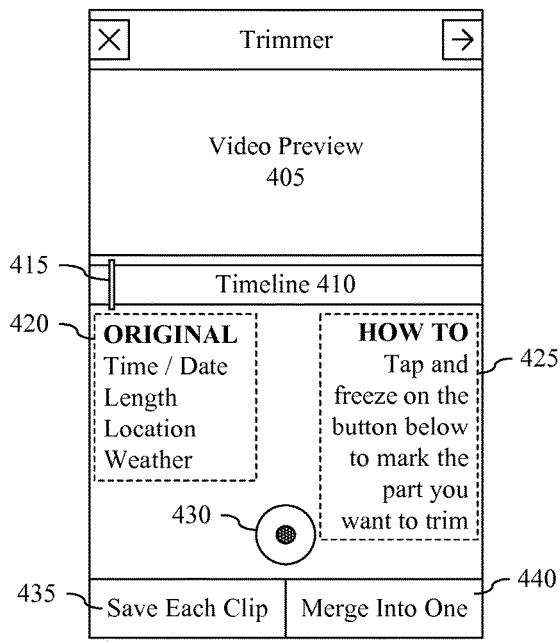
FIG. 4 is a block diagram illustrating an exemplary display of a data processing system.

FIG. 4 is a block diagram illustrating an exemplary display of a data processing system such as device 105 of FIG. 1. FIG. 4 illustrates a view 400 that may be presented while executing trimmer 314 to edit a recorded video.

As pictured, view 400 includes a video preview region 405. A video may be played for purposes of determining which portions of the video are to be trimmed. The video may be played within video preview region 405. A timeline 410 of the video being edited and/or previewed is displayed. Timeline 410 may be configured to display thumbnail images of the video in a sequential, linear format. A play head 415 indicates which part of the video being edited and/or previewed, in timeline 410, is currently being displayed within video preview region 405.

Region 420 displays data about the video itself such as the time and date of the video that is being edited. Region 420 further may display metadata recorded concurrently with the video. For example, the metadata may include, but is not limited to, location where the video was recorded and the weather conditions while the video was recorded. As discussed, the metadata may be time aligned, or synchronized, with the video being edited. Region 425 provides the user with useful instructions and/or tips for using trimmer 314.

Control 430 may be a multipurpose control that may take on a plurality of different states depending upon context. For example, control 430 may take on two or more different states at different times, e.g., serially, depending upon context. In one aspect, control 430 provides single point control over the trimming process. In the state illustrated in FIG. 4, control 430 may start playback of a selected video for trimming when in a trim mode and the video is not playing. In the trim mode, device 105 accepts trimming inputs from the user.

Controls 435 and 440 allow a user to specify a format of the trimmed video post trimming. Selection of control 435 causes device 105 to save each portion of untrimmed video as a separate clip or a separate video file. Selection of control 440 allows a user to select an option where, subsequent to noting one or more regions to be trimmed, the resulting untrimmed portions of the video are merged into one video or one file.

Figure 5:
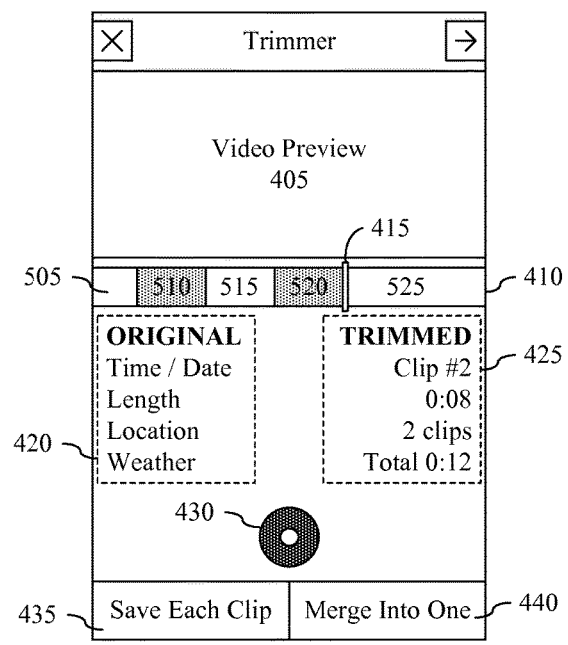
FIG. 5 is a block diagram illustrating another exemplary display of a data processing system.

FIG. 5 is a block diagram illustrating another exemplary display of a data processing system such as device 105 of FIG. 1. FIG. 5 illustrates a view 500 that may be presented while executing trimmer 314 to edit a recorded video. In one aspect, view 500 may be presented responsive to a user selecting control 430 of FIG. 4. Responsive to the user selecting control 430, playback of the selected video may begin within video preview region 405. Play head 415 begins moving along timeline 410.

As the video selected for editing begins playing, the functionality of control 430 changes to indicate portions of the selected video that are to be trimmed. As defined herein, the term "trim" means removing a portion of a video from the video being edited. Post trimming, playback of the edited video would skip or otherwise exclude the trimmed or removed portion(s) of video. In the example of FIG. 5, control 430 may be used to mark regions of the selected video that will be preserved and kept within the final trimmed video referred to as "keep regions." Those portions of the video where control 430 is not pressed, or activated, may be designated as trim regions, where trim regions are regions to be removed from the video. For example, responsive to the user selecting control 430, device 105 stores the time or location within the selected video as a start of a keep region. Responsive to the user deselecting control 430, e.g., removing one's finger from control 430, device 105 stores the time or location within the selected video as the end of the keep region.

In illustration, clips 505, 515, and 525 represent portions of the selected video that are trim regions. Clips 510 and 520 represent portions of the video that are keep regions. For example, as the selected video is played, the user does not activate or select control 430 when play head 415 is located at the left edge of clip 505. The user selects control 430 when play head 415 is located at the left edge of clip 510 and continues selecting control 430 until play head 415 reaches the right edge of clip 510. The user does not touch control 430 while play head 415 moves through clip 515. The user again selects control 430 when play head 415 is located at the left edge of clip 520 and continues selecting control 430 until play head 415 reaches the right edge of clip 520. The user deselects control 430 when play head 415 is located at the right edge of region 520. It should be appreciated that clips 510 and 520 are visually distinguished as keep regions from clips 505, 515, and 525 designated as trim regions responsive to the user marking the regions using control 430 and not before.

In the example of FIG. 5, region 425 is updated to convey information relating to the clips that are to be trimmed from the selected video. Region 425, for example, may convey information about the most recent clip of video selected for trimming as well as information relating to the total number of clips selected for trimming. For example, since clip 515 is the most recent region designated for trimming, region 425 may provide specific information about clip 515. In particular, region 425 indicates that clip 515 is eight seconds long. Regarding the total number of clips, region 425 indicates that two clips, i.e., clips 505 and 515, have been designated for trimming. In this example, the trimming process may be ongoing so that play head 415 has not reached the end of the video to designated region 525 as a trim region. Region 425 also indicates that the total length of material to be trimmed so far, i.e., clips 505 and 515, is 12 seconds in length. As defined herein, the term "clip" means a portion of a video, e.g., an amount of video that is less than the whole of the video.

Figure 6:
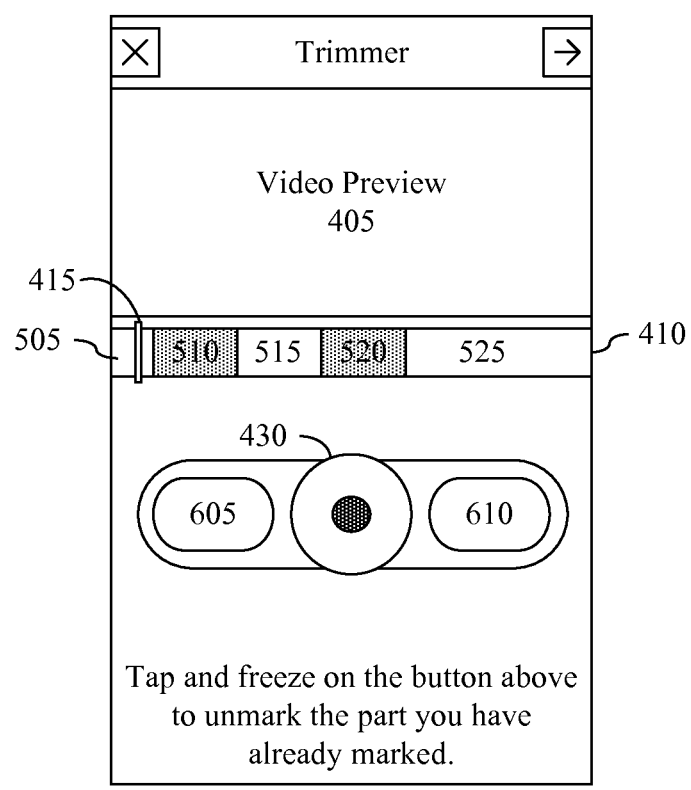
FIG. 6 is a block diagram illustrating another exemplary display of a data processing system.

FIG. 6 is a block diagram illustrating another exemplary display of a data processing system such as device 105 of FIG. 1. FIG. 6 illustrates a view 600 that may be presented responsive to completing playback of the selected video in the trim mode where user input selecting clips for trimming has completed. View 600 may be presented to allow a user to clear any trim regions that have been designated. For example, responsive to sliding control 430 to region 605, all indicators designating clips 505, 515, and 525 as trim regions may be cleared from timeline 410. Responsive to sliding control 430 to region 610, the device may initiate the trimming process and/or continue to present an interface for a next editing operation. Upon completing the trimming process, or finalizing the video, the video is saved without clips 505, 515, and 525. For example, clips 510 and 520 may be saved as individual clips (e.g., files) or clips 510 and 520 may be saved in order as a single clip or video file.

Figure 7:
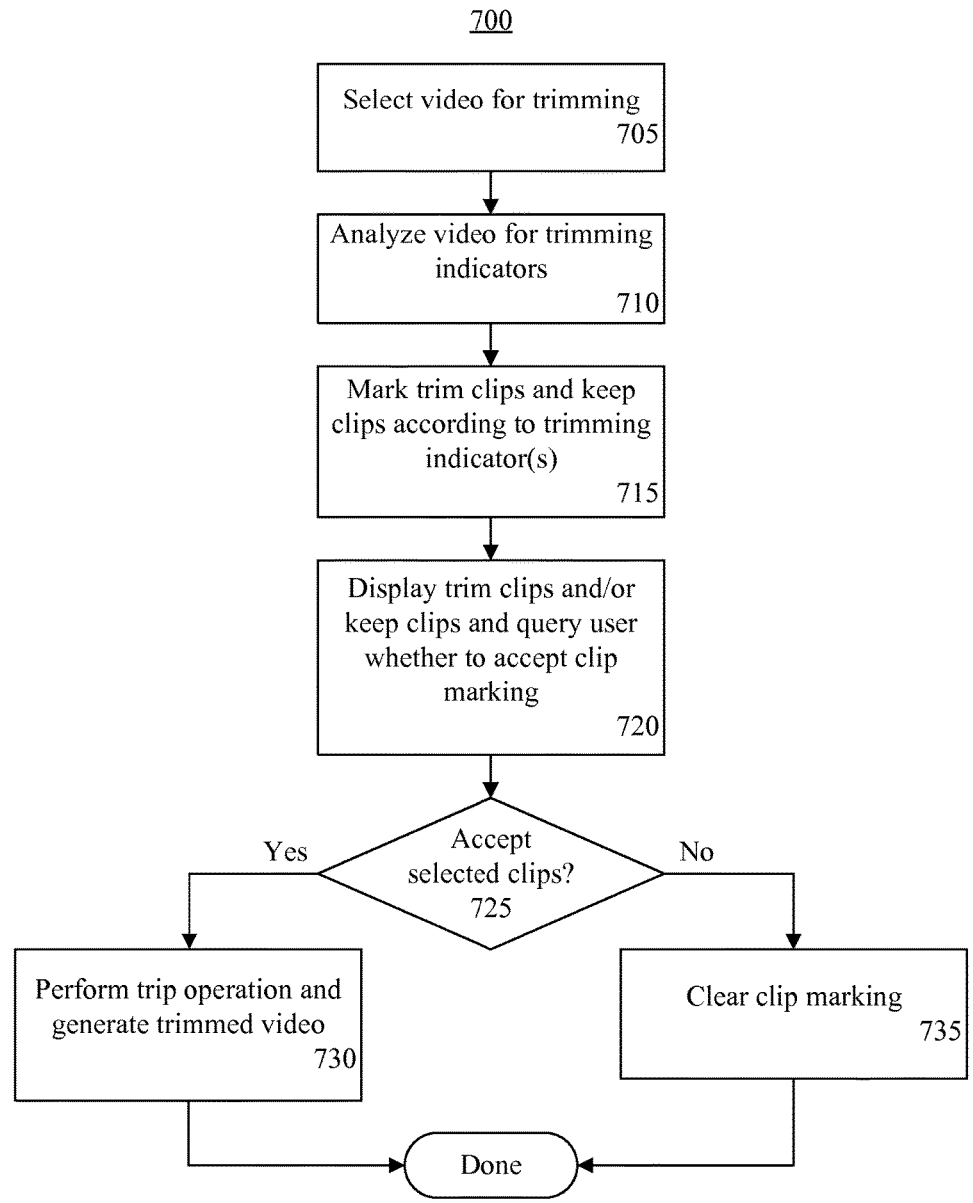
FIG. 7 is a flow chart illustrating an exemplary method of trimming video.

FIG. 7 is a flow chart illustrating an exemplary method 700 of trimming video. Method 700 may be implemented by a data processing system such as device 105 of FIG. 1. Method 700 illustrates an automated technique for trimming a video.

Method 700 may begin in block 705 where a video is selected for trimming. In one aspect, the device receives a user input selecting a video stored on the device. The video may be selected for general video editing where a workflow including one or more different editors may be applied or may be selected specifically for trimming.

In bock 710, the device analyzes the video for one or more trimming indicators. Examples of trimming indicators may include, but are not limited to, lack of movement, lack of objects of interest such as persons in frame, dark frames such as may occur when frames are captured while the device is located in a user's pocket, drastic color changes, a lack of change, and the like. In one aspect, the analysis of block 710 may be performed by comparing adjacent frames of video and identifying differences between the compared frames. Other techniques such as object recognition, facial recognition, and/or the like may be performed.

In another aspect, the metadata recorded by the various sensors of the device concurrently with the video being edited may be analyzed. Trimming indicators that may be determined from the metadata may include, but are not limited to, a lack of change between consecutive items of metadata, significant change in consecutive items of metadata, and/or the like. Examples of significant changes in consecutive items of metadata may include a change from loud to quiet, from quiet to loud, a change in location over time, a lack of change in location over time, a change in speed, and/or the like.

The device may mark or annotate those clips of the video in which trimming indicators are detected. For example, the device may mark regions of the video with no detected objects of interest, regions with a lack of movement or less than a minimum amount of movement, regions with dark frames, and regions with little change in consecutive items of metadata, etc., as trim regions.

In block 720, the device may display the trim clips and/or the keep clips and query the user whether to accept the clip marking. For example, the device may display a timeline where trim clips are visually differentiated from keep clips in the timeline. The trim clips and keep clips may be displayed and/or visualized as described with to FIGS. 5 and 6.

In block 725, the device determines whether the user accepted the clip marking. Responsive to determining that the user accepted the clip marking, method 700 proceeds to block 730. In block 730, the device performs the trim operation and generates trimmed video without the trim clips. Responsive to the user rejecting the clip marking, method 700 proceeds to block 735. In block 735, the device clears the clip marking.

It should be appreciated that in another example, the user may adjust the automatically determined clip marking. For example, the user may delete a trim clip and/or keep clip marking, leave one or more other selected clips intact or unaltered, adjust start and/or end times of one or more trim and/or keep clips, or the like. The user may then select an option to proceed with the trimming process or clear the clip marking.

Figure 8:
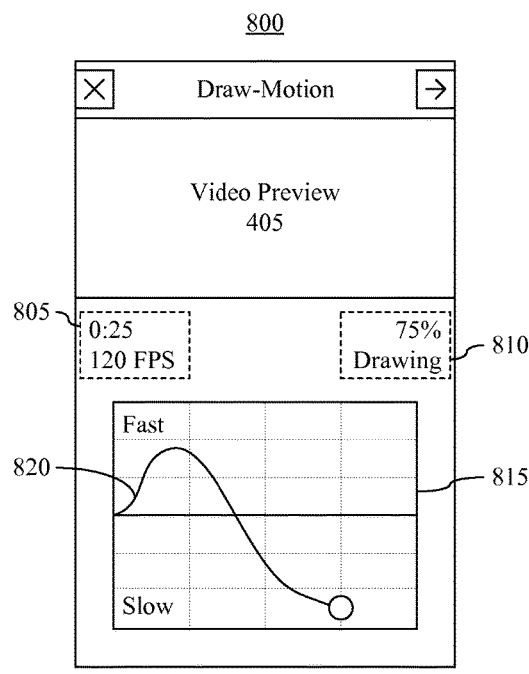
FIG. 8 is a block diagram illustrating another exemplary display of a data processing system.

FIG. 8 is a block diagram illustrating another exemplary display of a data processing system such as device 105 of FIG. 1. FIG. 8 illustrates a view 800 that may be presented while executing draw motion creator 316 to edit a recorded video.

Many video recording enabled devices are able to record video higher than standard frame rates. The devices are able to playback video at various frame rates, e.g., slower than normal playback, faster than normal playback, at normal playback, etc., to achieve different visual effects such as fast motion and/or slow motion. Draw motion creator 316, upon execution, provides a user with a sense of direct physical manipulation of the video playback speed by drawing a curve on a grid layout.

Referring to FIG. 8, a user may draw a line or curve within region 815. The vertical axis of region 815 denotes the playback speed in frames per second. The horizontal axis of region 815 denotes the duration of the video playback at the speed set by the level of the vertical axis. The user may increase or decrease playback speed of a selected video by drawing a line that rises above and/or below the middle of region 815, which may represent the frame rate at which the video was recorded.

Region 805 indicates that the video being edited is 25 seconds in duration at 120 frames per second. Region 810 indicates that the user is approximately 75 percent through the duration of the video in terms of drawing the playback speed as line 820. As the user draws line 820, video preview region 405 may scrub through the video to correlate the video preview with the location of the user's touch on the x-axis of region 815.

Figure 9:
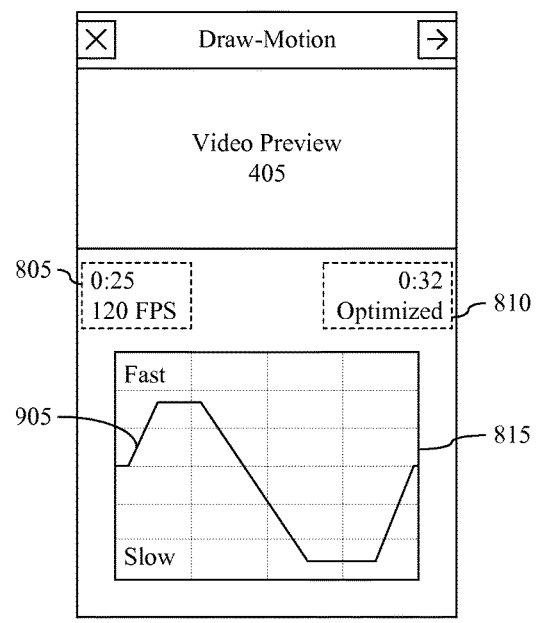
FIG. 9 is a block diagram illustrating another exemplary display of a data processing system.

FIG. 9 is a block diagram illustrating another exemplary display of a data processing system such as device 105 of FIG. 1. FIG. 9 illustrates a view 900 that may be presented while executing draw motion creator 316 responsive to the user completing line 820 of FIG. 8.

As pictured, region 815 displays an optimized version of line 820 now displayed as line 905. The device may adjust line 820 to generate line 905 by applying smoothing or the like to achieve a better looking slow or fast motion video effect. In this example, curves may be straightened into linear segments. Region 805 continues to display the original frame rate of the video being edited and the original duration of the video. Region 810 is updated to indicate the duration the video if played back with the changing frame rate indicated by line 905. In this example, while the frame rate is increased in most of the first half of playback of the video, the frame rate is decreased in the latter half. The more extensive use of slow motion as indicated by line 905 results in the video being 7 seconds longer than the original video. FIG. 9 illustrates that metadata for the video being edited may be updated to continue to specify the original frame rate and duration, while also specifying the changing framerate and resulting duration.

FIGS. 8 and 9, taken collectively, illustrate that a user gesture may be detected that draws a line. In one aspect, the user gesture may be a continuous gesture. The user gesture may be concurrent with a playback of the video over time. The user gesture, and as such, the drawn line, are correlated with playback speeds, e.g., frame rates, of the video over time. As such, the resulting line drawn by the user gesture indicates playback speeds that may be stored in association with various times in the video. The video is later played back in accordance with the playback speeds.

In another aspect, the device may provide recommendations for audio to accompany the video. The suggestions for audio may include sound effects and/or background music for the recorded video and may be determined from an analysis of the video and/or metadata for the video. The analysis may compare adjacent frames of the video, audio from the video, and/or items of metadata collected during recording of the video. For example, the device may compare adjacent frames of video to detect motion. The device may analyze metadata collected during recording of the video to detect motion. Metadata from an accelerometer, gyroscope, compass, etc., may indicate a quantifiable amount of motion taking place while the video was recorded.

The device may suggest music with a particular tempo and/or rhythm based upon the analysis. In illustration, the device may suggest music with a faster tempo or an up-beat rhythm such as hip-hop, rock music, or the like responsive to determining that the video, the audio, and/or the metadata indicates a high level of motion. The device may suggest music with a slower tempo or a rhythm such as classical music or music with a particular instrument such as French horn responsive to determining that the video, the audio, and/or the metadata indicates a lower level of motion and/or was taken in a panoramic mode. In any case, audio suggestions for the video may be synchronized with any frame rate playback changes implemented by the user using draw motion creator 316.

Figure 10:
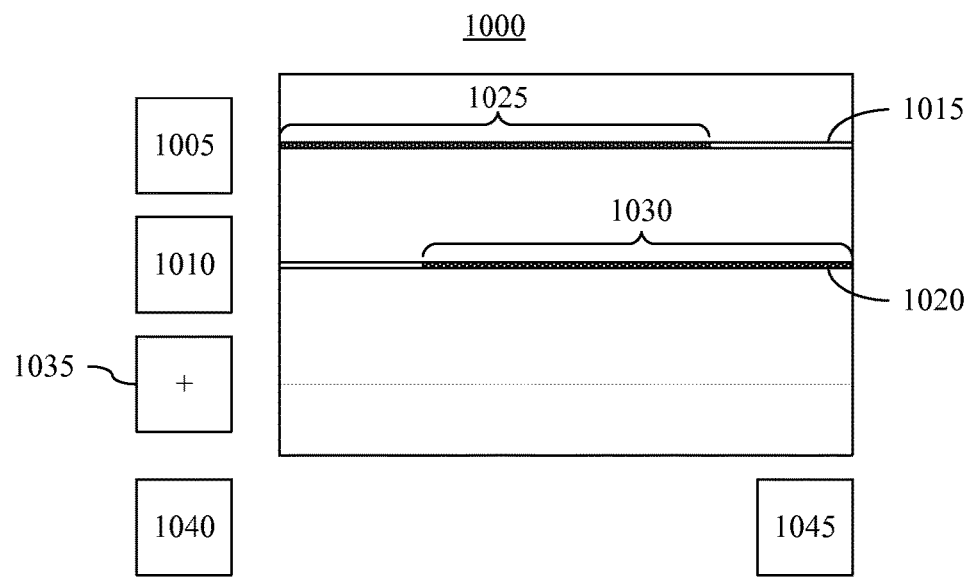
FIG. 10 is a block diagram illustrating another exemplary display of a data processing system.

FIG. 10 is a block diagram illustrating another exemplary display of a data processing system such as device 105 of FIG. 1. FIG. 10 illustrates a view 1000 that may be presented while executing video mixer 318 to edit recorded videos. The device may splice or merge separate recorded videos together into a single video using video mixer 318.

In one aspect, one or more additional videos may be included in the video editing process. The videos may be recorded by one or more other devices. For example, a user may record video using a mobile phone or one or more other wearable devices such as a video enabled smart watch, video enabled glasses, video enabled neck-ware, or the like. Further, the video may be taken in a concurrent manner or at least overlap in time so that multiple, different video perspectives may be used during the editing process, where video taken by each different video recording device is considered a different perspective. In another aspect, one or more of the videos to be edited using video mixer 318 may be videos from networked devices in close proximity to the device of the user, and/or videos from an online social networking platform from connected users.

Referring to FIG. 10, potentially diverse sources of video inputs may be used to create one video with cuts, or edits, to different perspectives over time. The metadata of the time and physical location of the video recording may also be used to automatically collect or generate suggestions for videos taken from the cameras of other devices or by other people in close proximity at the same time or that overlap in time.

In the example of FIG. 10, the user has selected two different videos for editing. Two different videos are to be merged to create a single, merged video. The first video is represented in preview region 1005. The second video is represented in preview region 1010. As a user scrubs forward in time or backward in time, previews of the first and second videos are displayed within regions 1005 and 1010, respectively, in synchronization with one another.

Within view 1000, the first and second videos are also graphically represented along timelines 1015 and 1020. The device may analyze the first and second videos to determine starting and ending times and place a representation of each respective video in proper order and synchronized on timelines 1015 and 1020. Reference number 1025 illustrates the relative position of the first video on timeline 1015. Reference number 1030 illustrates the relative position of the second video on timeline 1020. Shaded portions of timelines 1015 and 1020 indicate times along the timelines where video exists. Unshaded portions indicate that no video exists at that point in the timeline. The first and second videos are displayed in a time aligned manner with same times in each respective video being vertically aligned. Thus, from view 1000, one can see that the first video began earlier in time than the second video. Further, the second video continues later in time than the first video.

Control 1035, when selected, allows user to select one or more additional videos to be included within the editing process. Control 1040, when selected, allows a user to select audio to be used as background music for the resulting video. Control 1045, once selected, indicates to the device that the user is done with the video mixing process. For example, responsive to a user selection of control 1045, the device may render the finalized video that includes only those portions of the first and second video selected by a user.

Figure 11:
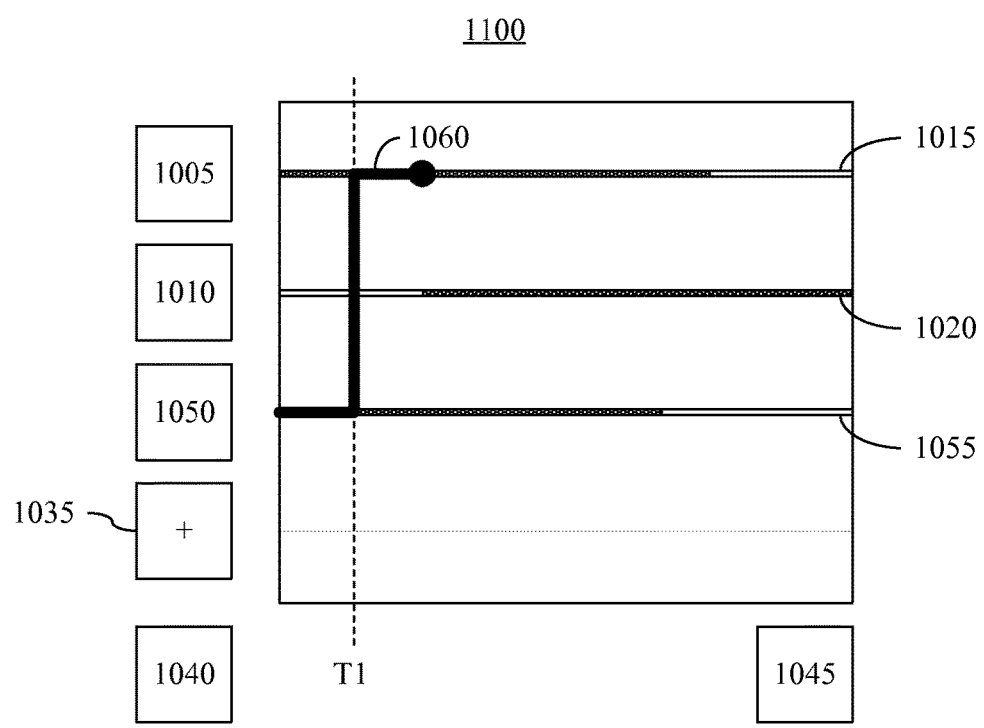
FIG. 11 is a block diagram illustrating another exemplary display of a data processing system.

FIG. 11 is a block diagram illustrating another exemplary display of a data processing system such as device 105 of FIG. 1. FIG. 11 illustrates a view 1100 that may be presented while executing video mixer 318. In the example of FIG. 11, an additional video, i.e., a third video, represented by preview region 1050 is added. Further, the third video is graphically represented on timeline 1055.

As pictured, the user has started drawing line 1060. The user draws a horizontal portion of line 1060 along each portion of a video that is to be included in the resulting merged video. In this example, the user begins at the beginning of timeline 1055 thereby selecting the first portion of the third video for inclusion in the merged video. At time T1, given that timelines 1015, 1020, and 1055 are time aligned, the user moves up to timeline 1015 and begins to move horizontally along timeline 1015. Line 1060 indicates which portions of each of the various selected videos, e.g., the first, second, and/or third videos in this example, are to be included in the resulting merged video.

In the example of FIG. 11, videos may be displayed using a grid layout that provides users with a sense of direct physical manipulation of the videos when mixing thereby making the video editing process simple and intuitive. The user may draw and/or tap to create line 1060 along the clips of the videos that are to be included in the edited video.

Figure 12:
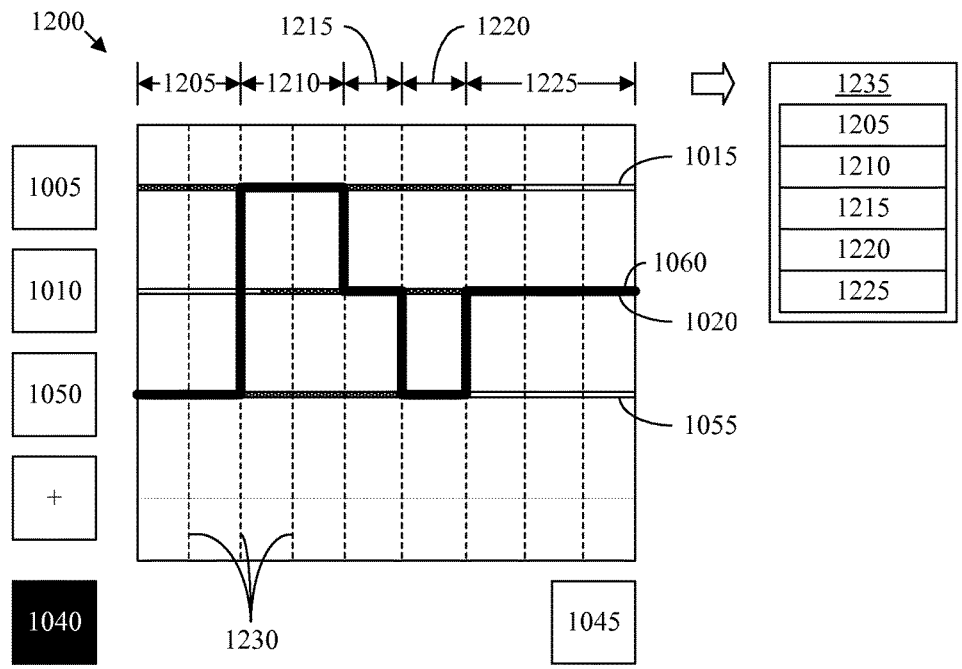
FIG. 12 is a block diagram illustrating another exemplary display of a data processing system.

FIG. 12 is a block diagram illustrating another exemplary display of a data processing system such as device 105 of FIG. 1. FIG. 12 illustrates a view 1200 that may be presented while executing video mixer 318. In the example of FIG. 12, the user has finished drawing line 1060. Further, the user has selected control 1040 and selected audio to be used for background music for the merged video. In one aspect, the device may analyze the beats and timing of the selected audio and superimpose a grid where the vertical lines 1230 of the grid are time aligned with beats of the selected audio and overlaid upon the various video timelines. The device further may adjust the various edit points so that horizontal segments of line 1060 start and end on gridlines and vertical segments of line 1060 are positioned on gridlines. This time aligns merge points between selected clips of the first, second, and/or third videos with beats and/or timing of the selected background audio.

The resulting video, shown as video file 1235, combines portions of the first, second, and third videos into a single video file. For example, video file 1235 includes clips 1205, 1210, 1215, 1220, and 1225. Clips 1205-1225 are time aligned with each of timelines 1015, 1020, and 1050. For purposes of discussion, the first video corresponds to timeline 1015, the second video to timeline 1020, and the third video to timeline 1055. Thus, referring to clips 1205-1225 and line 1060, clip 1205 is taken from the third video, clip 1210 from the first video, clip 1215 from the second video, clip 1220 from the third video, and clip 1225 from the second video. For example, responsive to selection of control 1040, video file 1235, which is formed of clips 1205-1225, may be exported or otherwise saved to memory.

Figure 13:
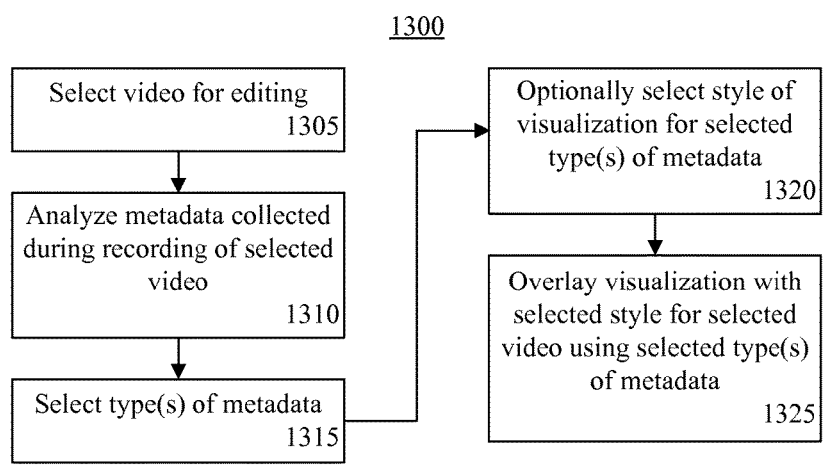
FIG. 13 is a flow chart illustrating an exemplary method of editing video.

FIG. 13 is a flow chart illustrating an exemplary method 1300 of editing video. Method 1300 illustrates an automated, or semi-automated, processing technique for generating visualizations such as overlays for a selected video. Method 1300 illustrates various operations that may be performed by the device of FIG. 1 responsive to executing dynamic caption creator 322, for example. FIG. 13 illustrates an exemplary method where a device as described within this disclosure may play metadata collected from sensors as captions superimposed on the video during playback.

Method 1300 may begin in a state where one or more videos have been recorded. Further, metadata has been collected and stored during recording of the video(s). In block 1305, the device may select a video for editing. The selected video may be one specified by a user input received by the device.

In block 1310, the device analyzes the metadata collected during recording of the selected video. Metadata, as discussed, may be collected from the various sensors of the device, peripherals coupled to the device, and/or obtained from services accessible by the device. Exemplary items of metadata may include, but are not limited to, location, accelerometer data, gyroscope information, digital compass information, pedometer information, altitude information, internal time, heart rate, blood pressure, respiration, hydration, temperature, etc.

In block 1315, the device selects one or more types of metadata. A type of metadata refers to a particular class or category of metadata such as data items generated by a particular sensor and/or obtained from a particular service. In one aspect, the device may select a type of metadata that changes most or at least more than a minimum amount for the duration of the video. For example, altitude of the user during the video may vary the most, or more than a minimum amount, and be selected. The device selects the altitude as the type of metadata for use in the visualization that will be generated. In another example, the speed of the user may be determined to vary more than a minimum amount or be greater than a specified speed threshold and, in consequence, be selected as the type of metadata to be used for the visualization.

In block 1320, the device may optionally select a style of visualization for the selected type of metadata. In one aspect, a visualization, or graphical theme for the visualization, may be selected based upon the particular type of metadata that is selected. In another aspect, the device may select two or more different styles of visualization from which the user may pick. For example, the device may display previews or thumbnail views of the selected video with the different visualization options using the selected type of metadata. The user may select the desired visualization style.

In block 1325, the device may overlay, or superimpose, the selected visualization with the selected style. The selected visualization includes the selected type of metadata. For example, the altitude may be overlaid upon the video using a selected style of visualization. As the video plays, the overlay includes the updated altitude information. The altitude data items, for example, may be played back as part of the overlaid visualization in time with the video playback. An edited video may be generated where the overlay is rendered as part of the edited video.

It should be appreciated that the device may select more than one different type of metadata and a visualization style for each selected type of metadata. Further, metadata may be enriched and presented as an overlay. For example, the device may have a location in terms of latitude and longitude. The device may use the location to determine a location name (e.g., a city) and/or the weather for the location. The device further may show a path of the user on a map for the location. The overlay may be updated so that the particular items of metadata shown, e.g., heartrate, location, etc., change over time in synchronization with the video. Thus, an overlay illustrating one's heartrate, location, and/or altitude, for example, may be displayed as the video plays with the metadata being updated in time with the video.

In another example, the device may record metadata over a period of time and import recorded video that overlaps in time with the recorded metadata. The device may be used to generate and/or suggest metadata visualizations as described for the imported video.

Figure 14:
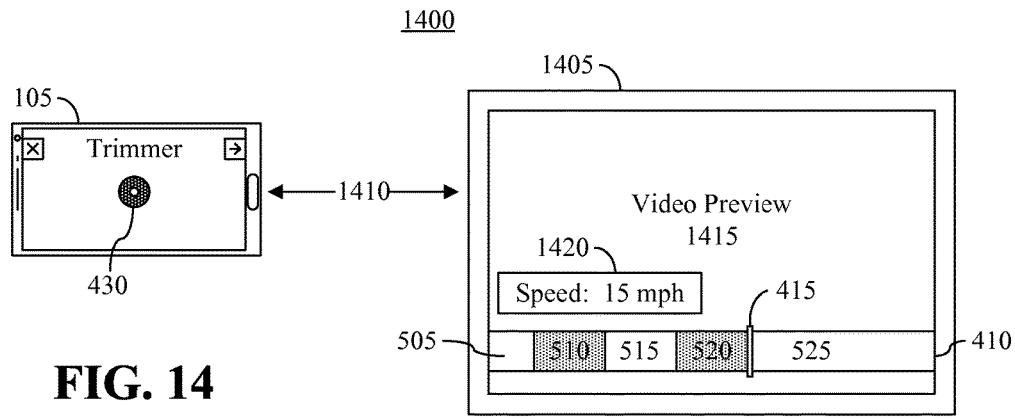
FIG. 14 is a block diagram illustrating an exemplary distributed editing system.

FIG. 14 is a block diagram illustrating an exemplary distributed editing system 1400. As pictured, distributed editing system 1400 includes device 105 coupled to a device 1405 through a communication link 1410. In one example, device 1405 may be a television, a computer such as a tablet computer or the like. Communication link 1410 may be a wired or wireless connection. In one aspect, communication link 1410 may be established through another intermediary network node such as a wireless access point and/or router. In another aspect, communication link 1410 may be established as a direct connection, e.g., using a cable directly coupling device 105 and device 1405 or as a direct wireless communication link between device 105 and device 1405.

In any case, with device 105 coupled to device 1405 while in an editing mode, device 105 may enter an editing state where controls for the editing operations are displayed while any video segments to be previewed, timelines, and the like may be provided to device 1405 via communication link 1410. In the example of FIG. 14, device 105 is using trimmer 314. Responsive to coupling to device 1405 while using trimmer 314 or any editor described within this disclosure, device 105 displays control 430 or other controls while providing video preview 1415 to device 1405 for display. Further device 1405 displays timeline 410. As pictured, the various clips marked for trimming and/or keeping are displayed on device 1405 instead of device 105.

By providing the video previews and other information to a larger display using the distributed editing feature illustrated in FIG. 14, a user is able to pay attention to fine visual details that are difficult to discern on a smaller display. Further, the user is able to continue using the physical touch interface of device 105 while taking advantage of the larger display of device 1405.

FIG. 14 further illustrates an example of metadata that has been automatically selected and superimposed on the video. In this example, visualization 1420 is superimposed on the video in video preview 1415. While visualization 1420 is shown as having a text style, other styles may be used. For example, the speed may be shown using an analog speedometer as the style of visualization for the selected type of metadata. Any of a variety of different colors, fonts, and/or visualization techniques such as translucency may also be used.

Figure 15:
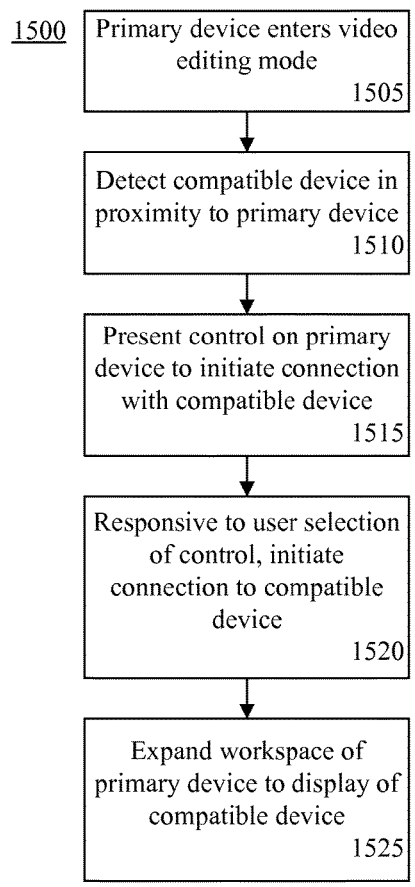
FIG. 15 is a flow chart illustrating an exemplary method of distributed editing.

FIG. 15 is a flow chart illustrating an exemplary method 1500 of distributed editing. Method 1500 may be performed by a system as described with reference to FIG. 14. For purposes of discussion, device 105 is referred to as the primary device while describing method 1500; and, device 1405 is described as the compatible device.

Method 1500 may begin in block 1505 where the primary device enters a video editing mode. In one aspect, entering a video editing mode may include executing any one or more of editors 304 and/or executing software architecture 300 in general. Video editing mode may be invoked responsive to a user request to edit video.

In block 1510, the primary device detects a compatible device in proximity to the primary device. In one aspect, the term "in proximity" means that the primary device is able to establish a direct connection with the compatible device. Examples of a direct connection may include, but are not limited to, a direct wireless communication link such as a Bluetooth communication link, a direct wired communication link, or the like. In another aspect, the term "in proximity" means that the primary device is able to establish a connection with the compatible device over a local area network whether wired or wireless.

In block 1515, responsive to detecting the compatible device, the primary device displays a control to initiate a connection with the compatible device. In block 1520, responsive to a user selection of the control displayed in block 1515, the primary device initiates a connection to the compatible device.

In block 1525, having established the connection with the compatible device, the primary device expands the video editing workspace to the compatible device. In one aspect, expanding the video editing workspace of the primary device to the compatible device may include displaying one or more controls on the primary device while sending video previews or the like to the compatible device for display thereon. For example, the primary device may display only video editing controls while the larger display of the compatible device is used to only to display video previews and/or timelines.

Figure 16:
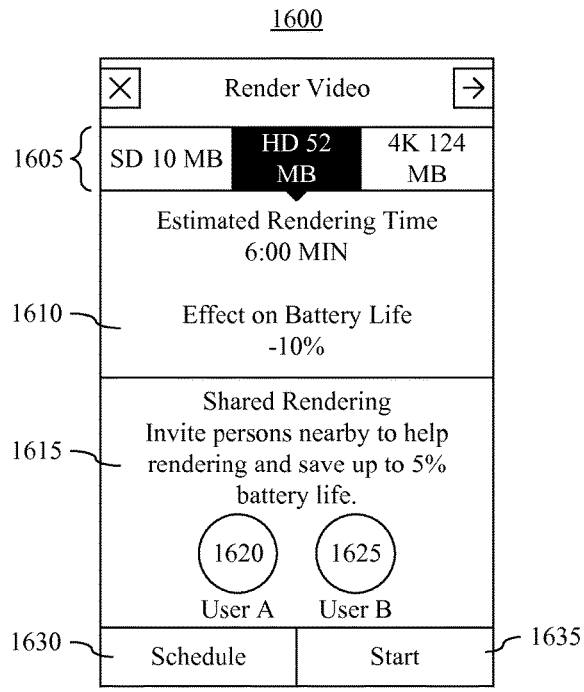
FIG. 16 is a block diagram illustrating another exemplary display of a data processing system.

FIG. 16 is a block diagram illustrating another exemplary display of a data processing system such as device 105 of FIG. 1. FIG. 16 illustrates a view 1600 that may be presented while rendering video. For example, rendering video may be performed by executing finisher 324. In the example of FIG. 16, a user has finished editing one or more videos using one or more of editors 304 and is about to render the video. As used herein, the term "render," as applied to video editing, means generating a finalized and edited version of the video where the various video edits specified by the user and/or automatically suggested by the device are implemented in the finalized or edited video result.

The user may select one of a plurality of different video output formats using controls 1605. In this example, the user has selected an output format of "HD" representing high definition video. The device estimates that the size of the resulting video file from the rendering process will be 52 MB in size. Other video output selections include "SD" for standard definition which will require only 10 MB and "4K" for ultra-high definition which will require 124 MB. Each different output format will have a different number of horizontal lines or a different resolution. In region 1610, the device provides information about the rendering process selected by the user. In this example, the device indicates the estimated time required for rending using the device alone and the anticipated effect upon the life, or charge, of the battery. In this example, generating an HD video as an output is estimated to take 6 minutes and consume approximately 10% of the available battery life.

In region 1615, the device indicates that two other devices may be available for rendering. Each of indicators 1620 and 1625, for example, may represent an available device. Indicators 1620 and/or 1625 may be icons, pictures, or other images. It should be appreciated that the number of indicators displayed will vary according to the number of devices detected. Thus, fewer than two indicators may be displayed or more than two indicators displayed. In one aspect, an available device may be one or more servers and/or virtualized servers available for performing rending operations. In another aspect, indicators 1620 and/or 1625 may represent a device of a user known to the user of device 105, e.g., a contact. In another aspect, indicators 1620 and/or 1625 may represent another device of the user of device 105 or another device determined to be proximate to device 105 as previously described. In the example of FIG. 16, indicator 1620 represents a user A and indicator 1625 represents a user B.

The user of device 105 may invite the devices represented by indicators 1620 and/or 1625 to participate in rendering video. For example, responsive to a user selection of indicator 1620, device 105 sends an invitation to the device represented by indicator 1620 to participate in video rendering. The user of the invited device may accept or reject the invitation. If accepted, device 105 may send a portion of the video rendering job, e.g., one or more video rendering operations, to the invited device. The invited device implements the video rendering operation(s) and sends the result(s) back to device 105 for inclusion or use in the finalized video.

A schedule control 1630 and a start control 1635 are also provided. Schedule control 1630 initiates a scheduling operation where the user may schedule various video editing and/or uploading operations. Start control 1635, responsive to a user selection, initiates video rendering.

Figure 17:
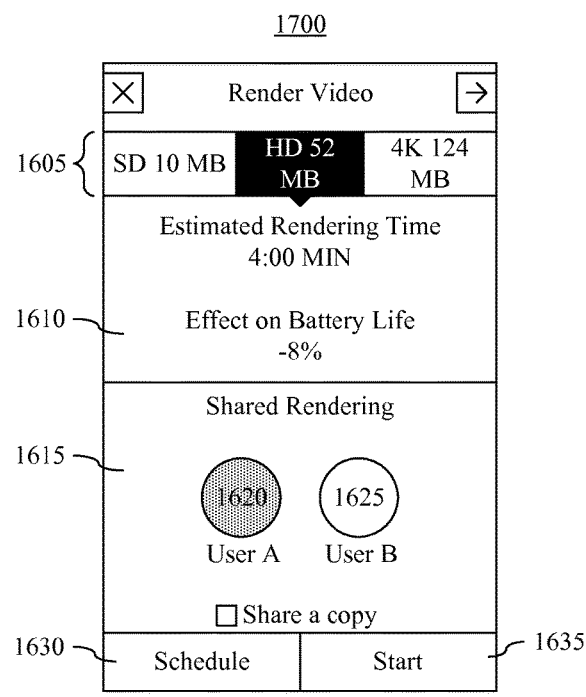
FIG. 17 is a block diagram illustrating another exemplary display of a data processing system.

FIG. 17 is a block diagram illustrating another exemplary display of a data processing system such as device 105 of FIG. 1. FIG. 17 illustrates a view 1700 that may be presented responsive to a user selection of indicator 1620. Responsive to the user selecting indicator 1620, device 105 sends an invitation to participate in video rendering to the device represented by indicator 1620. In the example of FIG. 17, the user of the invited device has accepted the invitation. Accordingly device 105 sends one or more video rendering operations, e.g., work items, to the invited device for processing. In consequence, the estimated rendering time displayed in region 1610 is reduced from 6 minutes to 4 minutes. Further, the amount of battery of device 105 required to perform rendering is reduced. Rendering now requires only 8% of the remaining battery life as opposed to 10% prior to sharing the rendering operations.

Within region 1615, an additional control is provided that when selected, causes device 105 to share the rendered video. For example, with the "share a copy" checkbox selected, the rendered video may be uploaded to one or more selected social networking platforms or otherwise made available to one or more other users. The sharing, or uploading, may occur as scheduled by the user as described herein in greater detail.

In one aspect, the "share a copy" checkbox, when selected, may cause device 105 to share a copy of the resulting video with user A associated with indicator 1620. The ability to quickly and effortlessly share a copy of the resulting video may be an incentive for user A and other users to join in the rendering process. In one example, whether the "share a copy" checkbox is selected may be included in any invitation sent from device 105 to other devices. The recipient of the invited device, for example, may make the decision whether to accept the invitation and join the rendering process based, at least in part, upon whether a copy of the resulting video will be shared.

Figure 18:
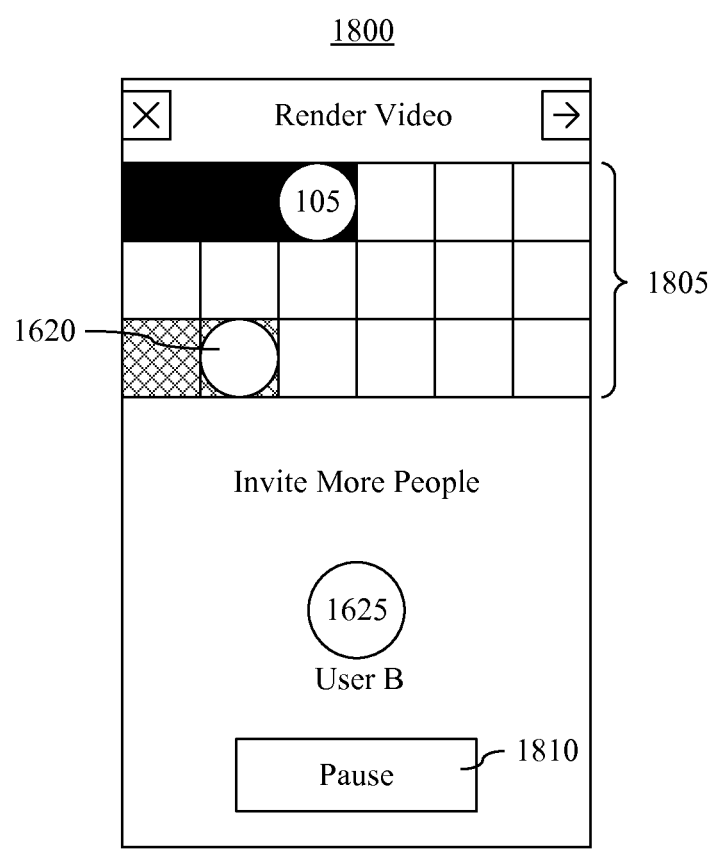
FIG. 18 is a block diagram illustrating another exemplary display of a data processing system.

FIG. 18 is a block diagram illustrating another exemplary display of a data processing system such as device 105 of FIG. 1. FIG. 18 illustrates a view 1800 that may be presented responsive to a user selection of start control 1635. View 1800 illustrates the progress of the video rendering taking place. Region 1805, for example, shows an abstracted view of progress in completing video rendering operations. The blocks of region 1805 represent the video rendering operations that are to be performed. As video rendering operations are completed, more blocks become shaded. In the example of FIG. 18, blocks representing rendering operations completed by device 105 are shaded solid and include indicator for device 105. Blocks representing rendering operations completed by the invited device are shaded with crosshatching and include indicator 1620. Operations completed by any other devices that have been invited and accepted the invitation may be visually distinguished in the same or similar manner.

At any point during the rendering operations, a user of device 105 may invite additional people to participate in the rendering process. For example, at any point while rendering takes place, the user of device 105 may select indicator 1625 to invite the device of user B to participate in the rendering process. Further, at any point during the rendering process, the user of device 105 may select pause control 1810 to pause the rendering options. Similarly, the invited device, once rendering starts, may display a control that, responsive to selection, causes the invited device to pause and/or terminate video rendering operations. The invited device, under control of a user, may pause or terminate video rendering operations at any time thereby allowing the user to withdraw or terminate participation in video rendering.

Figure 19:
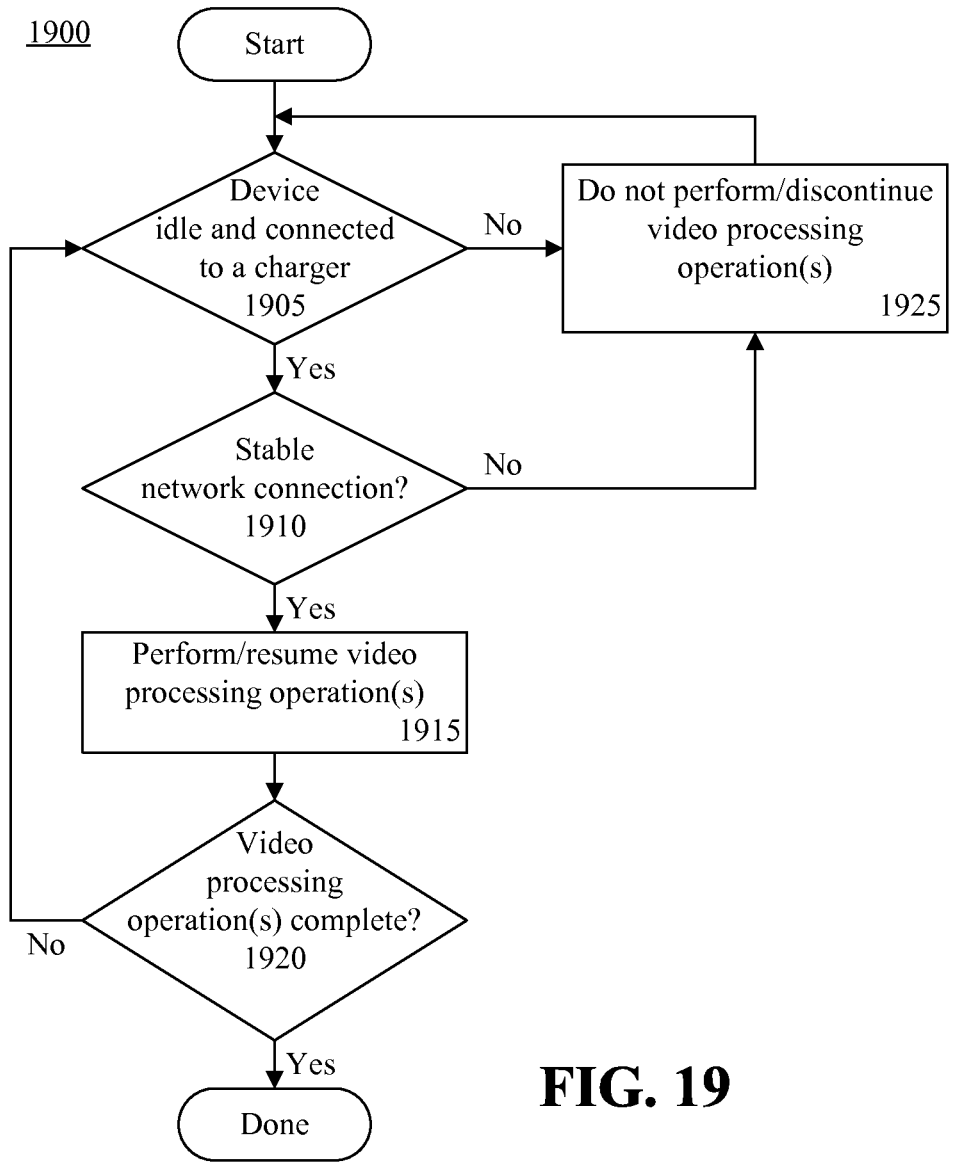
FIG. 19 is a flow chart illustrating a method of scheduling video processing operations.

FIG. 19 is a flow chart illustrating a method 1900 of scheduling video processing operations. Method 1900 may be implemented by device 105 as described herein. In one aspect, method 1900 may be implemented responsive to user selection of schedule control 1630. Exemplary video processing operations that may be used with method 1900 may include, but are not limited to, video rendering and/or sharing, e.g., uploading, rendered videos.

In block 1905, the device determines whether the device is idle and also connected to a charger, e.g., a power source other than the internal battery. If so, method 1900 continues to block 1910. If not, method 1900 proceeds to block 1925. In block 1925, the device does not perform video processing operations or discontinues video processing operations that may have already been initiated. In the example of FIG. 19, video processing operations may include rendering and/or sharing the finalized video generated from rendering.

Continuing with block 1910, the device may determine whether a stable network connection exists. If a stable network connection exists, method 1900 may continue to block 1915. If not, method 1900 may proceed to block 1925.

In one aspect, a network connection may be a Wi-Fi connection for the device. A Wi-Fi connection may be a wireless network that the device may join that complies with one or more of the 802.11x specifications implementing wireless LAN communications. A stable network connection may be a Wi-Fi connection that is maintained with less than a minimum amount of connection loss, intermittency, and/or data loss. In one example, in cases where the operations to be performed by the device do not include sharing, block 1910 may be omitted or otherwise skipped.

In block 1915, the device may perform video processing operations. In the case where video processing operations have been discontinued, e.g., in the case where block 1925 was previously performed, the device may resume video processing operations. In block 1920, the device determines whether the video processing operations are complete. If not, method 1900 loops back to block 1905 to continue processing. If the video processing operations are complete, method 1900 is done.

Figure 20:
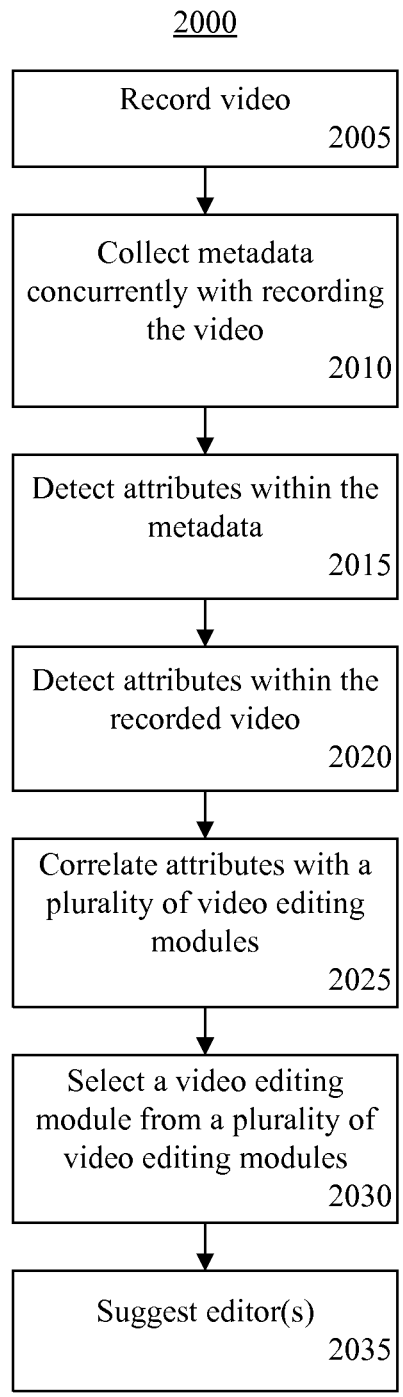
FIG. 20 is a flow chart illustrating an exemplary method of processing video.

FIG. 20 is a flow chart illustrating an exemplary method 2000 of processing video. Method 2000 may be performed by device 105 as described herein. In one exemplary implementation, method 2000 may be performed through execution of architecture 300. For example, workflow manager 308 including video analyzer 310 and profiler 312, when executed, may implement one or more of the operations of FIG. 20.

Method 2000 may begin in block 2005 where the device records video. In block 2010, the device collects metadata concurrently with recording the video. The metadata may be stored within the device. Further, the metadata may be synchronized in time with the recorded video. For example, the items of metadata may be time aligned with the video.

In block 2015, the device may detect one or more attributes within the metadata. For example, the device may determine whether the metadata indicates a high level of activity. High level of activity may be indicated by the location of the device changing rapidly, the altitude of the device changing rapidly, whether rapid motion, turning, acceleration, or deceleration is detected, etc. In another example, the device may determine whether one or more types of metadata collected by a sensor of the device changes over time by more than a minimum amount or rate. As discussed, the device may detect attributes including, but not limited to, trimming indicators, motion, starting time and ending time of video, change or lack of change in items of metadata, etc.

In block 2020, the device may detect one or more attributes within the video. The device may detect attributes including, but not limited to, trimming indicators, video type, motion, frame rate, starting and/or ending times of videos, or the like. In one example, the device may analyze the video to detect objects of interest in the video including people. The device, for example, may utilize facial recognition technology. In another example, the device may determine whether the video includes more than a minimum amount of motion. For instance, the device may compare consecutive frames for evidence of change indicating motion. In still another example, the device may determine whether the video is taken using a panoramic setting, whether the video is taken at an increased frame rate, or the like.

In block 2025, the device correlates the attributes determined in block 2015 and/or 2020 with one or more of a plurality of different editors. As an example, one or more types of metadata changing more than a minimum amount over time or at a rate that is faster than a minimum rate may indicate that dynamic caption creator 322 may be used. Portions, e.g., clips, of the recorded video determined to not include items of interest may be associated with using trimmer 314. Determining that the video is recorded at a frame rate that is higher than normal may be associated with using draw motion creator 316.

In block 2030, the device selects one or more editors from the plurality of editors according to the correlation performed in block 2025. Any editor associated with an attribute found within the video and/or the metadata may be selected. In block 2035, the device may suggest using one or more of the editors selected in block 2030. The device, for example, may present a list of the editors selected in block 2030 to the user.

In another example, the device may initiate a video editing workflow. The video editing workflow may include the selected editors. The video editing workflow, as implemented by the device, may execute one or more editors in a predetermined order. The user may use the editors selected as part of the workflow or skip usage of one or more of the editors. In this regard, usage of one or more or all of the editors by the user is optional and may be viewed as suggestions. Still, the user may be presented with each editor with the recorded video of block 2005 pre-loaded for processing.

In still another aspect, any of the automatically suggested edits described herein may be suggested to the user as the user begins to utilize the corresponding editor in the workflow or the editor suggested by the device. For example, as the trimmer 314 executes, any clips automatically identified by the device for trimming may be presented to the user. As the user begins using the dynamic caption creator 322, any automatically determined overlays may be presented as suggestions to the user.

As discussed, once a video is rendered, the video may be shared to one or more social networking systems, video storage systems, or the like. With the large volume of videos available to users, locating videos of interest may be difficult. This may be particularly true when a user first begins using a video and/or content delivery service. In that case, the user has little or no history established with the content delivery service. Still, the content delivery service is tasked with determining videos of interest to the user and making such videos available.

Figure 21:
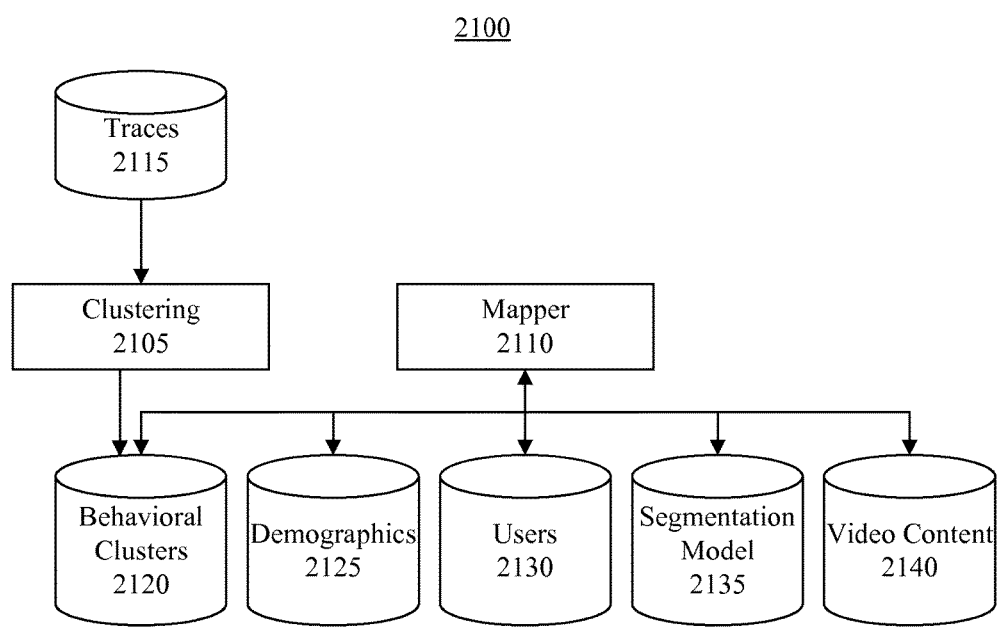
FIG. 21 is a block diagram illustrating an exemplary software architecture for a data processing system.

FIG. 21 is a block diagram illustrating an exemplary software architecture 2100 for a data processing system. In one example, software architecture 2100 may be used by back-end system 110 of FIG. 1. In general, software architecture 2100, when executed within a data processing system, implements a runtime video content discovery and/or delivery system.

As pictured, architecture 2100 may include a response module 2110. Architecture 2100 further may include behavioral clusters 2120, users groups 2130, a segmentation model 2135, and video content 2140. In general, response module 2110 may be a module that may be executable by a processor. Behavioral clusters 2120, users groups 2130, segmentation model 2135, and video content 2140 represent various forms of data utilized by response module 2110. It should be appreciated that while behavioral clusters 2120, user data 2130, segmentation model 2135, and video content 2140 represent data, the different data types noted are stored in physical memory elements of backend system 110 and/or another system coupled to backend system 110.

As part of a training process, to be distinguished from a runtime process, traces may be used to determine behavioral clusters 2120. Traces refer to data stored in memory elements. Traces may include a list of items that users have accessed from their device, a list of items that users are re-posting or otherwise sharing online using a device, marking as favorite using a device, marking as "like" using a device, etc. In the case of FIG. 21, the items may be videos. For purposes of discussion, the term "video" may mean a video file and/or a reference to a video file such as a Universal Resource Identifier (URI) or the like. In one aspect, each item of trace data may be stored in association with identifying information of the user that accessed, reposted, shared, etc., the particular video.

As part of training, behavioral clusters 2120 may be generated using the traces. Each behavioral cluster within behavioral clusters 2120 specifies a group of one or more users that have one or more similar attributes of user behavior in common. More particularly, each behavioral cluster is a group of one or more users that share one or more attributes of user behavior relating to videos. The attributes may include, but are not limited to, which videos are accessed, times when videos may have been accessed, which videos have been shared, which videos have been reposted, which videos have been marked as "favorite", which videos have been marked as "like," etc. Users in a same behavioral cluster, for example, each may like one or more same classifications of video. In this regard, video content 2140 may include one or more videos where each video is associated with one or more behavioral clusters of behavioral clusters 2120.

Clustering techniques are generally known in the art. In general, a system attempts to classify a particular user into a group of users, e.g., a behavioral cluster, by matching patterns of behavior of the user with patterns of behavior of users of the group. Once the user is classified, one or more predictions may be made about the user based upon preferences and/or choices of other users in the same group.

User groups 2130 may also specify one or more groups of users. For example, the groups may be clusters of users. In one aspect, users within user groups 2130 may not be included within any of behavioral clusters 2120. For example, users specified in user groups 2130 may be new users that have not yet been assigned to a behavioral cluster and/or do not have sufficient user traces for processing into a behavioral cluster of behavioral clusters 2120. In another aspect, users within user groups 2130 may be included in one or more of behavioral clusters 2120. User groups 2130 may be determined through a training process and, as such, be available for use in a runtime system as illustrated in FIG. 21.

Users of user groups 2130 may be organized into groups according to demographic data of the users. The demographic data may also be stored as part of user groups 2130. In one aspect, each user group of user groups 2130 may be defined by an item of demographic data. In another aspect, each user group of user groups 2130 may be defined by one or more items of demographic data. Demographic data may include any of a variety of different items of data that may be used to form groups of users. For example, demographic data may specify an address and/or a zip code, income level, gender, ethnicity, race, age, birthdate, or other data of a user. Demographic data may also include the particular make and model of the device one uses, the version of operating system being executed on the mobile phone or device, and data that may be collected by sensors of the phone or device, e.g., metadata. It should be appreciated that demographic data may also include any items of information that the user chooses to share with back-end system 110. For example, the user may log into a video sharing system or other social networking platform in which the user has established a profile including video preferences. Information from the user's profile may be included within the demographic data used to form user groups. Additional examples of demographic data may also include information determined from external database lookups. Each of user groups 2130 may be defined by one or more different items of demographic data.

Segmentation model 2135 may specify associations of user groups 2130 with behavioral clusters 2120. Segmentation model 2135 may be generated using a training process and, as such, be available for use at runtime as part of system 2100. In one aspect, segmentation model 2135 may be generated by holding each behavioral cluster of behavioral clusters 2120 constant and determining salient demographic data items or user groups. For example, a comparison of demographic data items may be performed to determine which demographic data items for users vary, or vary the most, across different ones of behavioral clusters 2120 and which demographic data items remain constant across users in a same behavioral cluster. Items of demographic data that vary across behavioral clusters while remaining constant for users within a same behavioral cluster are considered salient and indicative of an association between the behavioral clusters and the item of demographic data, or user group(s) formed at least in part according to the salient item(s) of demographic data.

In one example, associations between behavioral clusters 2120 and user groups 2130, as specified in segmentation model 2135, may be determined using a measure of set similarity. In another exemplary implementation, the associations specified in segmentation model 2135 may be determined according to correlations of demographic data items (or user groups) and behavioral clusters 2120 using clustering (e.g., K-means).

In illustration, consider the case where the video preferences of a user are not known and the user has not made any video queries or at least very few. The user, from a device, submits a request 2145 for video. If one or more items of demographic data such as the user's age, gender, and address are known, response module 2110 may determine that the user belongs to a selected user group of user groups 2130. Response module 2110 may determine one or more selected behavioral clusters 2120 associated with the selected user group. Response module 2110, for example, may determine that the video preferences for the user are the same as, or similar to, those of the users of the selected behavioral cluster 2120 associated with the selected user group 2130 including the user that originated request 2145.

For example, if the user belongs to a selected user group 2130 having the same age, gender, and similar location as users in a selected behavioral cluster 2120, response module 2110 may determine that the user has the same or similar video preferences as other users in the selected behavioral cluster 2120 despite the user and/or device that issued request 2145 not being formally placed in the behavioral cluster during a training process. Response module 2110 may determine one or more video suggestions 2150 from video content 2140 and send video suggestions 2150 to the device of the requesting user as a response.

Figure 22:
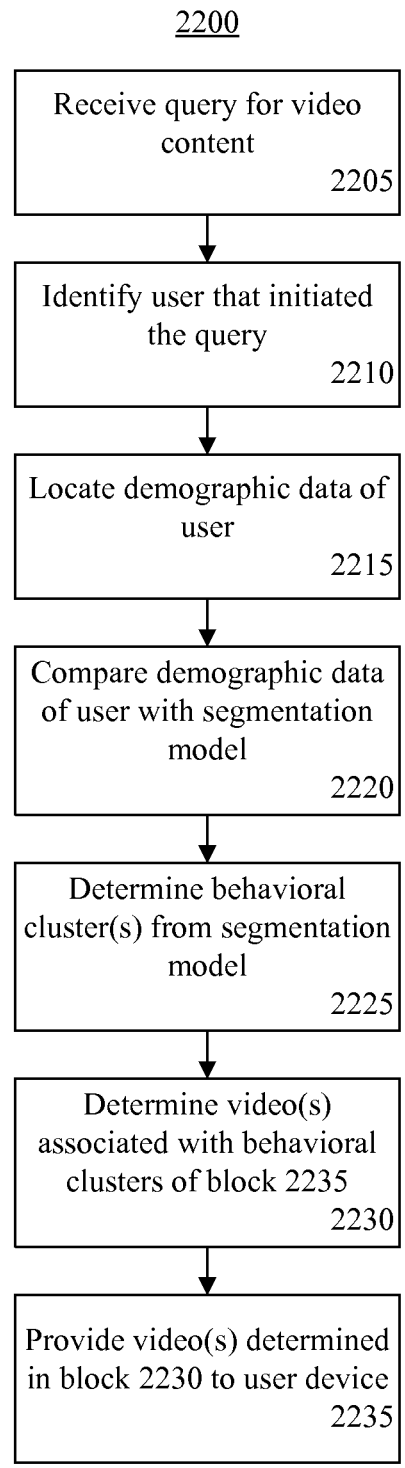
FIG. 22 is a flow chart illustrating an exemplary method of providing videos of interest to a user.

FIG. 22 is a flow chart illustrating an exemplary method 2200 of discovering video content and providing videos of interest to a user. Method 2200 may be performed by back-end system 110 of FIG. 1. Method 2200 may be implemented to provide videos of interest to a user that has not yet accumulated sufficient trace data for purposes of being placed into a behavioral cluster.

In block 2205, the back-end system may receive a request for video content from a user. The query may be received, for example, from a device of the user. In block 2210, the back-end system may identify the user that initiated the request. The user may be identified by user provided data, according to the device from which the request is received, or the like. It should be appreciated that in one aspect, a user identity may be associated with device information so that the identity of the user may be determined according to the device used to send the request. In one example, the response module may determine a user identifier from the request. The identifier, whether for the user or for the device, may be matched or correlated with stored user data. In block 2215, the back-end system may locate demographic data for the user.

In block 2220, the back-end system may determine one or more user groups to which the user belongs. For example, the back-end system may compare the demographic data of the user with the user groups. The user groups, as discussed, are defined or determined according to demographic data.

In block 2225, the back-end system may determine one or more behavioral clusters associated with the user groups determined in block 2220. The back-end system, for example, may determine the behavioral cluster(s) using the segmentation model. The system may determine that the user and/or user device that submitted the request is likely to have similar video interests as members of the behavioral cluster(s) determined from the segmentation model in block 2225.

In the example above, the system may place the requesting user and/or device into a user group and use the user group or groups to lookup one or more behavioral clusters for the user from the segmentation model. In another aspect, the segmentation model may correlate one or more items of demographic data with one or more different behavioral clusters. Further, the segmentation model may apply different weights, e.g., multiplication factors, to a combination of different demographic items of the user where the result of applying the weights may then be mapped to one or more different behavioral clusters using the segmentation model. In any case, the system determines one or more behavioral clusters for the user and/or device that initiated the request for video content according to demographic data of the user and/or device.

In block 2230, the back-end system determines one or more different videos that are associated with the behavioral cluster(s) selected in block 2225. Each of the behavioral clusters may be associated with one or more different videos. For example, each behavioral cluster may be associated with a particular class and/or genre of video. Behavioral clusters may be associated with entire classes and/or genres of videos, where the videos may be ranked within each class and/or genre according to any of a variety of different criteria such as what is currently trending, likes, etc.

In block 2235, the back-end system may provide one or more video(s) determined in block 2230 to the user device from which the request was received. In one aspect, providing the videos may include providing references, or links, to the video(s) so that the user may retrieve, view, and/or share the video(s). For example, the back-end system may generate a Webpage or other markup language specifying the videos determined in block 2230. The back-end system may then forward the Webpage to the requesting device.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer program product" means a system, device, apparatus, and/or manufacture that includes a computer readable storage medium.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method may include collecting, using a processor, metadata from a sensor concurrently with recording a video, wherein the metadata is synchronized in time with the video, and detecting, using the processor, at least one of attributes of the metadata or attributes of the video. The method may include correlating, using the processor, the attributes with a plurality of editors, selecting, using the processor, an editor from the plurality of editors according to the correlating, and displaying, using the processor, the selected editor for the video.

The method may include marking clips in the video for trimming according to user activation of a trim control during playback of the video. The method further may include trimming the video according to the marked clips.

The method may include receiving a user gesture specifying frame rates of the video over time and storing the frame rates in association with times in the video.

The method may include aligning visual representations of a plurality of different videos in time, receiving a user input drawing a line over different ones of the visual representations selecting clips of the plurality of different videos to be visible at different times, and generating a mixed video including only the selected clips of each of the plurality of videos in chronological order. In one aspect, the method may include adjusting a start time or an end time of at least one of the selected clips to coincide with a detected beat in a time synchronized audio file.

The method may include superimposing metadata on the video.

In one aspect, the metadata may be collected from a plurality of different sensors. The method may include determining which of the plurality of sensors exhibits at least a minimum level of activity during recording of the video, selecting items of the metadata generated from the determined sensor, and superimposing the items of metadata on the video in synchronization with the video.

The method may include, from a first device, inviting a second device to perform distributed video processing, responsive to determining that the second device has accepted the invitation, sending a selected video processing operation of a plurality of video processing operations to the second device. A result of the selected video processing operation may be received from the second device. The result may be combined with a result of at least other of the plurality of video processing operations.

The method also may include delaying implementation of a video processing operation until the processor, within a device, determines that the device is idle and coupled to a power supply.

A system may include a processor programmed to initiate executable operations. The operations may include collecting metadata from a sensor concurrently with recording a video, wherein the metadata is synchronized in time with the video, detecting at least one of attributes of the metadata or attributes of the video, and correlating the attributes with a plurality of editors. The executable operations also may include selecting an editor from the plurality of editors according to the correlating and displaying the selected editor for the video.

The executable operations may include marking clips in the video for trimming according to user activation of a trim control during playback of the video. The executable operations may include trimming the video according to the marked clips.

The executable operations may include receiving a user gesture specifying frame rates of the video over time and storing the frame rates in association with times in the video.

The executable operations may include aligning visual representations of a plurality of different videos in time, receiving a user input drawing a line over different ones of the visual representations selecting clips of the plurality of different videos to be visible at different times, and generating an edited video including only the selected clips of each of the plurality of videos in chronological order. The executable operations may also include adjusting a start time or an end time of at least one of the selected clips to coincide with a detected beat in a time synchronized audio file.

The executable operations may include superimposing metadata on the video.

The metadata may be collected from a plurality of different sensors. In that case, the executable operations may include determining which of the plurality of sensors exhibits at least a minimum level of activity during recording of the video, selecting items of the metadata generated from the determined sensor, and superimposing the items of metadata on the video in synchronization with the video.

The executable operations may also include, from a first device, inviting a second device to perform distributed video processing, responsive to determining that the second device has accepted the invitation, sending a selected video processing operation of a plurality of video processing operations to the second device, receiving a result of the selected video processing operation from the second device, and combining the result with a result of at least other of the plurality of video processing operations.

The executable operations may include, within a device, delaying implementation of a video processing operation until the processor determines that the device is idle and coupled to a power supply.

A computer program product may include a computer readable storage medium having program code stored thereon. The program code may be executable by a processor to perform a method. The method may include collecting metadata from a sensor concurrently with recording a video, wherein the metadata is synchronized in time with the video, detecting at least one of attributes of the metadata or attributes of the video, and correlating the attributes with a plurality of editors. The method may also include selecting an editor from the plurality of editors according to the correlating and displaying the selected editor for the video.

The method may include marking clips in the video for trimming according to user activation of a trim control during playback of the video. In that case, the method may include trimming the video according to the marked clips.

The method may include receiving a user gesture specifying frame rates of the video over time and storing the frame rates in association with times in the video.

The method may include aligning visual representations of a plurality of different videos in time, receiving a user input drawing a line over different ones of the visual representations selecting clips of the plurality of different videos to be visible at different times, and generating an edited video including only the selected clips of each of the plurality of videos in chronological order. In that case, the method may also include adjusting a start time or an end time of at least one of the selected clips to coincide with a detected beat in a time synchronized audio file.

The method may include superimposing metadata on the video.

The method may also include determining which of the plurality of sensors exhibits at least a minimum level of activity during recording of the video, selecting items of the metadata generated from the determined sensor, and superimposing the items of metadata on the video in synchronization with the video.

The method may also include, from a first device, inviting a second device to perform distributed video processing, responsive to determining that the second device has accepted the invitation, sending a selected video processing operation of a plurality of video processing operations to the second device, receiving a result of the selected video processing operation from the second device, and combining the result with a result of at least other of the plurality of video processing operations.

The method may also include, within a device, delaying implementation of a video processing operation until the processor determines that the device is idle and coupled to a power supply.

A method may include receiving a request for video content from a device using a processor, determining, using the processor, a behavioral cluster according to demographic data associated with the device, determining a video of interest associated with the behavioral cluster, and providing the video of interest to the device using the processor.

Determining a behavioral cluster may include comparing the demographic data with a segmentation model that correlates items of demographic data with a plurality of behavioral clusters.

A system may include a processor programmed to initiate executable operations. The executable operations may include receiving a request for video content from a device, determining a behavioral cluster according to demographic data associated with the device, determining a video of interest associated with the behavioral cluster, and providing the video of interest to the device.

Determining a behavioral cluster may include comparing the demographic data with a segmentation model that correlates items of demographic data with a plurality of behavioral clusters.

A computer program product may include a computer readable storage medium having program code stored thereon. The program code may be executable by a processor to perform a method. The method may include receiving a request for video content from a device, determining a behavioral cluster according to demographic data associated with the device, determining a video of interest associated with the behavioral cluster, and providing the video of interest to the device.

Determining a behavioral cluster may include comparing the demographic data with a segmentation model that correlates items of demographic data with a plurality of behavioral clusters.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
collecting, using a processor, metadata from a sensor concurrently with recording a video, wherein the metadata is synchronized in time with the video;
detecting, using the processor, at least one of attributes of the metadata or attributes of the video;
correlating, using the processor, the attributes with a plurality of video editors by determining which video editor of the plurality of video editors is associated with the attributes, wherein the correlating determines that more than one of the video editors of the plurality of video editors are associated with the attributes;
selecting, using the processor, each video editor associated with at least one of the attributes from the plurality of video editors; and
executing each selected video editor in a predetermined order as part of a video editing workflow.

2. The method of claim 1, further comprising:
marking portions in the video for trimming according to user activation of a trim control during playback of the video, wherein the trim control is displayed as a user-interface control, and wherein each portion marked for trimming is defined by a continuous user activation of the trim control for a duration of each portion during playback; and
on a timeline of the video indicating current playback position within the video, visually distinguishing the portions marked for trimming from the portions in the video marked to keep.

3. The method of claim 1, further comprising:
receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and
storing the frame rates in association with times for the video.

4. The method of claim 1, further comprising:
displaying a plurality of time aligned and overlapping timelines concurrently, wherein each timeline represents one of a plurality of different videos;

receiving a user input drawing a continuous line over different portions of the timelines selecting clips of the plurality of different videos to be visible at different times, wherein the continuous line connects the selected clips; and generating a mixed video comprising only the selected clips of each of the plurality of videos in chronological order.

5. The method of claim 1, wherein the attributes within the video include objects recognized within the video.

6. The method of claim 1, further comprising:
superimposing a visualization on the video during playback wherein the visualization plays back the metadata in synchronization with the video, wherein the metadata is derived from a biological sensor.

7. The method of claim 1, wherein the metadata is collected from a plurality of different sensors resulting in a plurality of different types of metadata, the method further comprising:
determining a type of the metadata for the video that changes at least a minimum amount for a duration of the video from the plurality of different types of the metadata; and
superimposing a visualization on the video during playback wherein the visualization plays back the determined type of metadata in synchronization with the video;
wherein the determined type of metadata is at least one of metadata derived from a biological sensor or metadata indicating motion.

8. The method of claim 1, further comprising:
detecting, from a first mobile device, that a second mobile device is proximate to the first mobile device through a direct connection or a local area network;
responsive to the detecting, from the first mobile device, inviting the second mobile device to perform distributed video processing;
responsive to determining that the second mobile device has accepted the invitation, sending a selected video processing operation of a plurality of video processing operations to the second mobile device;
receiving, within the first mobile device and from the second mobile device, a result of the selected video processing operation as performed by the second mobile device; and
combining the result with a result of at least one other of the plurality of video processing operations performed by the first mobile device.

9. The method of claim 1, further comprising:
displaying each selected video editor.

10. A system, comprising:
a processor programmed to initiate executable operations comprising:
collecting metadata from a sensor concurrently with recording a video, wherein the metadata is synchronized in time with the video;
detecting at least one of attributes of the metadata or attributes of the video;
correlating the attributes with a plurality of video editors by determining which video editor of the plurality of video editors is associated with the attributes, wherein the correlating determines that more than one of the video editors of the plurality of video editors are associated with the attributes;
selecting each video editor associated with at least one of the attributes from the plurality of video editors; and executing each selected video editor in a predetermined order as part of a video editing workflow.

11. The system of claim 10, wherein the processor is further programmed to initiate executable operations comprising:
marking portions in the video for trimming according to user activation of a trim control during playback of the video, wherein the trim control is displayed as a user-interface control, and wherein each portion marked for trimming is defined by a continuous user activation of the trim control for a duration of each portion during playback; and
on a timeline of the video indicating current playback position within the video, visually distinguishing the portions marked for trimming from the portions in the video marked to keep.

12. The system of claim 10, wherein the processor is further programmed to initiate executable operations comprising:
receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and
storing the frame rates in association with times for the video.

13. The system of claim 10, wherein the processor is further programmed to initiate executable operations comprising:
displaying a plurality of time aligned and overlapping timelines concurrently, wherein each timeline represents one of a plurality of different videos;
receiving a user input drawing a continuous line over different portions of the timelines selecting clips of the plurality of different videos to be visible at different times, wherein the continuous line connects the selected clips; and
generating an edited video comprising only the selected clips of each of the plurality of videos in chronological order.

14. The system of claim 10, wherein the attributes within the video include objects recognized within the video.

15. The system of claim 10, wherein the processor is further programmed to initiate executable operations comprising:
superimposing a visualization on the video during playback wherein the visualization plays back the metadata in synchronization with the video, wherein the metadata is derived from a biological sensor.

16. The system of claim 10, wherein the metadata is collected from a plurality of different sensors resulting in a plurality of different types of metadata, and the processor is further programmed to initiate executable operations comprising:
determining a type of the metadata for the video that changes at least a minimum amount for a duration of the video from the plurality of different types of metadata; and
superimposing a visualization on the video during playback wherein the visualization plays back the determined type of metadata in synchronization with the video;

wherein the determined type of metadata is at least one of metadata derived from a biological sensor or metadata indicating motion.

17. The system of claim 10, wherein the processor is further programmed to initiate executable operations comprising:
detecting, from a first mobile device, that a second mobile device is proximate to the first mobile device through a direct connection or a local area network;
from the first mobile device, inviting the second mobile device to perform distributed video processing;
responsive to determining that the second mobile device has accepted the invitation, sending a selected video processing operation of a plurality of video processing operations to the second mobile device;
receiving, within the first mobile device and from the second mobile device, a result of the selected video processing operation as performed by the second mobile device; and
combining the result with a result of at least one other of the plurality of video processing operations as performed by the first mobile device.

18. The system of claim 10, wherein the processor is further programmed to initiate executable operations comprising:
displaying each selected video editor.

19. A computer program product comprising a computer readable storage medium having program code stored thereon, the program code executable by a processor to perform a method comprising:
collecting metadata from a sensor concurrently with recording a video, wherein the metadata is synchronized in time with the video;
detecting at least one of attributes of the metadata or attributes of the video;
correlating the attributes with a plurality of video editors by determining which video editor of the plurality of video editors is associated with the attributes, wherein the correlating determines that more than one of the video editors of the plurality of video editors are associated with the attributes;
selecting each video editor associated with at least one of the attributes from the plurality of video editors; and
executing each selected video editor in a predetermined order as part of a video editing workflow.

20. The computer program product of claim 19, wherein the method further comprises:
marking portions in the video for trimming according to user activation of a trim control during playback of the video, wherein the trim control is displayed as a user-interface control, and wherein each portion marked for trimming is defined by a continuous user activation of the trim control for a duration of each portion during playback; and
on a timeline of the video indicating current playback position within the video, visually distinguishing the portions marked for trimming from the portions in the video marked to keep.

21. The computer program product of claim 19, wherein the method further comprises:
receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and
storing the frame rates in association with times for the video.

22. The computer program product of claim 19, wherein the method further comprises:
displaying a plurality of time aligned and overlapping timelines concurrently, wherein each timeline represents one of a plurality of different videos;
receiving a user input drawing a continuous line over different portions of the timelines selecting clips of the plurality of different videos to be visible at different times, wherein the continuous line connects the selected clips; and
generating an edited video comprising only the selected clips of each of the plurality of videos in chronological order.

23. The computer program product of claim 19, wherein the attributes within the video include objects recognized within the video.

24. The computer program product of claim 19, wherein the method further comprises:
superimposing a visualization on the video during playback wherein the visualization plays back the metadata in synchronization with the video, wherein the metadata is derived from a biological sensor.

25. The computer program product of claim 19, wherein the metadata is collected from a plurality of different sensors resulting in a plurality of different types of metadata, the method further comprising:
determining a type of the metadata for the video that changes at least a minimum amount for a duration of the video from the plurality of different types of the metadata; and
superimposing a visualization on the video during playback wherein the visualization plays back the determined type of metadata in synchronization with the video;
wherein the determined type of metadata is at least one of metadata derived from a biological sensor or metadata indicating motion.

26. The computer program product of claim 19, wherein the method further comprises:
detecting, from a first mobile device, that a second mobile device is proximate to the first mobile device through a direct connection or a local area network;
from the first mobile device, inviting the second mobile device to perform distributed video processing;
responsive to determining that the second mobile device has accepted the invitation, sending a selected video processing operation of a plurality of video processing operations to the second mobile device;
receiving, within the first mobile device and from the second mobile device, a result of the selected video processing operation as performed by the second mobile device; and
combining the result with a result of at least one other of the plurality of video processing operations performed by the first mobile device.

27. The computer program product of claim 24, the method further comprising:
displaying each selected video editor.

28. A method, comprising:
collecting, using a processor, metadata from a sensor concurrently with recording a video, wherein the metadata is synchronized in time with the video;

detecting, using the processor, at least one of attributes of the metadata or attributes of the video;

correlating, using the processor, the attributes with a plurality of video editors by determining which video editor of the plurality of video editors is associated with the attributes;

selecting, using the processor, a video editor associated with at least one of the attributes from the plurality of video editors;

displaying, using the processor, the selected video editor for editing the video;

receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and storing the frame rates in association with times for the video.

29. The method of claim 28, wherein the correlating determines that more than one of the video editors of the plurality of video editors are associated with the attributes, the method further comprising:

selecting each video editor of the plurality of video editors associated with the attributes;

wherein the displaying includes presenting a list including each selected video editor.

30. A system, comprising:

a processor programmed to initiate executable operations comprising:

collecting metadata from a sensor concurrently with recording a video, wherein the metadata is synchronized in time with the video;

detecting at least one of attributes of the metadata or attributes of the video;

correlating the attributes with a plurality of video editors by determining which video editor of the plurality of video editors is associated with the attributes;

selecting a video editor associated with at least one of the attributes from the plurality of video editors;

displaying the selected video editor for editing the video;

receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and storing the frame rates in association with times for the video.

31. The system of claim 30, wherein the correlating determines that more than one of the video editors of the plurality of video editors are associated with the attributes, the executable operations further comprising:

selecting each video editor of the plurality of video editors associated with the attributes;

wherein the displaying includes presenting a list including each selected video editor.

32. A computer program product comprising a computer readable storage medium having program code stored thereon, the program code executable by a processor to perform a method comprising:

collecting metadata from a sensor concurrently with recording a video, wherein the metadata is synchronized in time with the video;

detecting at least one of attributes of the metadata or attributes of the video;

correlating the attributes with a plurality of video editors by determining which video editor of the plurality of video editors is associated with the attributes;

selecting a video editor associated with at least one of the attributes from the plurality of video editors;

displaying the selected video editor for editing the video;

receiving a user gesture specifying varying frame rates for playback of the video over time, wherein the user gesture is received concurrently with playback of the video, and wherein the user gesture draws a continuous line in a region of a user interface where frame rate is correlated with a first axis of the region and duration of video playback at a selected frame rate is correlated with a second axis of the region; and storing the frame rates in association with times for the video.

33. The computer program product of claim 32, wherein the correlating determines that more than one of the video editors of the plurality of video editors are associated with the attributes, the method further comprising:

selecting each video editor of the plurality of video editors associated with the attributes;

wherein the displaying includes presenting a list including each selected video editor.

* * * * *